(12) United States Patent
Papasakellariou

(10) Patent No.: US 9,888,465 B2
(45) Date of Patent: Feb. 6, 2018

(54) CODEWORD DETERMINATION FOR ACKNOWLEDGEMENT INFORMATION

(71) Applicant: Samsung Electronics Co., Ltd, Suwon-si (KR)

(72) Inventor: Aris Papasakellariou, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 15/091,467

(22) Filed: Apr. 5, 2016

(65) Prior Publication Data

US 2016/0295561 A1    Oct. 6, 2016

Related U.S. Application Data

(60) Provisional application No. 62/143,569, filed on Apr. 6, 2015, provisional application No. 62/145,267, filed on Apr. 9, 2015, provisional application No. 62/172,306, filed on Jun. 8, 2015, provisional application No. 62/144,684, filed on Apr. 8, 2015.

(51) Int. Cl.
| | | |
|---|---|---|
| H04W 72/04 | (2009.01) | |
| H04L 5/14 | (2006.01) | |
| H04L 1/00 | (2006.01) | |
| H04L 1/18 | (2006.01) | |

(52) U.S. Cl.
CPC ......... *H04W 72/042* (2013.01); *H04L 1/0045* (2013.01); *H04L 1/1861* (2013.01); *H04L 5/14* (2013.01); *H04L 1/0072* (2013.01)

(58) Field of Classification Search
CPC .. H04W 72/042; H04L 1/1861; H04L 1/0045; H04L 5/14; H04L 1/0072
See application file for complete search history.

(56) References Cited

U.S. PATENT DOCUMENTS

| | | | |
|---|---|---|---|
| 8,588,259 B2 | 11/2013 | Papasakellariou et al. | |
| 8,837,450 B2 | 9/2014 | Papasakellariou et al. | |
| 2012/0106407 A1* | 5/2012 | Papasakellariou | ...... H04L 5/001 370/280 |
| 2013/0215807 A1 | 8/2013 | Yang et al. | |
| 2013/0301586 A1 | 11/2013 | Fan et al. | |
| 2014/0269452 A1 | 9/2014 | Papasakellariou | |
| 2014/0286208 A1 | 9/2014 | Papasakellariou et al. | |

(Continued)

FOREIGN PATENT DOCUMENTS

WO    2014157993 A1    10/2014

OTHER PUBLICATIONS

3GPP TS 36.211 V12.4.0 (Dec. 2014) 3rd Generation Partnership Project;Technical Specification Group Radio Access Network;E-UTRA;Physical channels and modulation(Release12)124pgs.

(Continued)

*Primary Examiner* — Ian N Moore
*Assistant Examiner* — Justin T Van Roie

(57) ABSTRACT

Methods and apparatus are provided for a base station to enable a user equipment (UE) configured for operation with carrier aggregation over a number of cells to determine cells and transmission time intervals (TTIs) where the base station transmits data information to the UE and for the UE to determine and arrange corresponding acknowledgement information in a codeword.

20 Claims, 15 Drawing Sheets

SF#0: $V_{DAI}^{DL-CT} = 1$ for Cell#2, $V_{DAI}^{DL-CT} = 2$ for Cell#5, $V_{DAI}^{DL-CT} = 3$ for Cell#7 - $V_{DAI,T}^{DL-T} = 3$
SF#1: $V_{DAI}^{DL-CT} = 4$ for Cell#3, $V_{DAI}^{DL-CT} = 5$ for Cell#6, $V_{DAI}^{DL-CT} = 6$ for Cell#7 -
SF#2: $V_{DAI}^{DL-CT} = 7$ for Cell#5, $V_{DAI}^{DL-CT} = 8$ for Cell#7 - $V_{DAI,T}^{DL-T} = 8$
SF#3: $V_{DAI}^{DL-CT} = 9$ for Cell#3, $V_{DAI}^{DL-CT} = 10$ for Cell#7 - $V_{DAI,T}^{DL-T} = 10$

(56) References Cited

U.S. PATENT DOCUMENTS

2014/0321382 A1* 10/2014 Guan ................ H04W 72/1289
370/329
2015/0049655 A1 2/2015 Yang et al.

OTHER PUBLICATIONS

3GPP TS 36.212 V12.3.0 (Dec. 2014)3rd Generation Partnership Project;Technical Specification Group Radio Access Network;E-UTRA; Multiplexing and channel coding (Release 12)89pgs.
3GPP TS 36.213 V12.4.0 (Dec. 2014) 3rd Generation Partnership Project;Technical Specification Group Radio Access Network;E-UTRA; Physical layer procedures (Release 12)225pgs.
3GPP TS 36.331 V12.4.0 (Dec. 2014) 3rd Generation Partnership Project;Technical Specification Group Radio Access Network;E-UTRA; RRC;Protocol specification(Release 12) 410pgs.
International Search Report dated Jul. 22, 2016 in connection with International Application No. PCT/KR2016/003611, 4 pages.

* cited by examiner

SF#0: Cell-Domain DAIs = {00, 01, 10}, Time-domain DAI = 10
SF#1: Cell-Domain DAIs = {00, 01, 10}, Time-domain DAI = 01
SF#2: Cell-Domain DAIs = {00, 01}, Time-domain DAI = 11
SF#3: Cell-Domain DAIs = {00, 01, 10}, Time-domain DAI = 10

| Cell#9 | Cell#9 | Cell#9 | Cell#9 |
|--------|--------|--------|--------|
| Cell#8 | Cell#8 | Cell#8 | Cell#8 |
| Cell#7 | Cell#7 | Cell#7 | Cell#7 |
| Cell#6 | Cell#6 | Cell#6 | Cell#6 |
| Cell#5 | Cell#5 | Cell#5 | Cell#5 |
| Cell#4 | Cell#4 | Cell#4 | Cell#4 |
| Cell#3 | Cell#3 | Cell#3 | Cell#3 |
| Cell#2 | Cell#2 | Cell#2 | Cell#2 |
| Cell#1 | Cell#1 | Cell#1 | Cell#1 |
| Cell#0 | Cell#0 | Cell#0 | Cell#0 |

SF#0: $V_{DAI}^{DL-CT} = 1$ for Cell#2, $V_{DAI}^{DL-CT} = 2$ for Cell#5, $V_{DAI}^{DL-CT} = 3$ for Cell#7

SF#1: $V_{DAI}^{DL-CT} = 4$ for Cell#3, $V_{DAI}^{DL-CT} = 5$ for Cell#6, $V_{DAI}^{DL-CT} = 6$ for Cell#7

SF#2: $V_{DAI}^{DL-CT} = 7$ for Cell#5, $V_{DAI}^{DL-CT} = 8$ for Cell#7

SF#3: $V_{DAI}^{DL-CT} = 9$ for Cell#3, $V_{DAI}^{DL-CT} = 10$ for Cell#7

| | | | |
|---|---|---|---|
| Cell#9 | Cell#9 | Cell#9 | Cell#9 |
| Cell#8 | Cell#8 | Cell#8 | Cell#8 |
| Cell#7 | Cell#7 | Cell#7 | Cell#7 |
| Cell#6 | Cell#6 | Cell#6 | Cell#6 |
| Cell#5 | Cell#5 | Cell#5 | Cell#5 |
| Cell#4 | Cell#4 | Cell#4 | Cell#4 |
| Cell#3 | Cell#3 | Cell#3 | Cell#3 |
| Cell#2 | Cell#2 | Cell#2 | Cell#2 |
| Cell#1 | Cell#1 | Cell#1 | Cell#1 |
| Cell#0 | Cell#0 | Cell#0 | Cell#0 |
| SF#0 | SF#1 | SF#2 | SF#3 |
| 1910 | 1920 | 1930 | 1940 |

FIGURE 19

SF#0: $V_{DAI}^{DL-CT} = 1$ for Cell#2, $V_{DAI}^{DL-CT} = 2$ for Cell#5, $V_{DAI}^{DL-CT} = 3$ for Cell#7 - $V_{DAI,T}^{DL-T} = 3$ SF#1: $V_{DAI}^{DL-CT} = 4$ for Cell#3, $V_{DAI}^{DL-CT} = 5$ for Cell#6, $V_{DAI}^{DL-CT} = 6$ for Cell#7 -

SF#2: $V_{DAI}^{DL-CT} = 7$ for Cell#5, $V_{DAI}^{DL-CT} = 8$ for Cell#7 - $V_{DAI,T}^{DL-T} = 8$ SF#3: $V_{DAI}^{DL-CT} = 9$ for Cell#3, $V_{DAI}^{DL-CT} = 10$ for Cell#7 - $V_{DAI,T}^{DL-T} = 10$

| | | | |
|---|---|---|---|
| Cell#9 | Cell#9 | Cell#9 | Cell#9 |
| Cell#8 | Cell#8 | Cell#8 | Cell#8 |
| Cell#7 | Cell#7 | Cell#7 | Cell#7 |
| Cell#6 | Cell#6 | Cell#6 | Cell#6 |
| Cell#5 | Cell#5 | Cell#5 | Cell#5 |
| Cell#4 | Cell#4 | Cell#4 | Cell#4 |
| Cell#3 | Cell#3 | Cell#3 | Cell#3 |
| Cell#2 | Cell#2 | Cell#2 | Cell#2 |
| Cell#1 | Cell#1 | Cell#1 | Cell#1 |
| Cell#0 | Cell#0 | Cell#0 | Cell#0 |
| SF#0 | SF#1 | SF#2 | SF#3 |
| 2010 | 2020 | 2030 | 2040 |

FIGURE 20

SF#0: $V_{DAI}^{DL-CT} = 1$ for Cell#2, $V_{DAI}^{DL-CT} = 2$ for Cell#5, $V_{DAI}^{DL-CT} = 3$ for Cell#7 - $V_{DAI,T}^{DL-T} = 3$ SF#1: $V_{DAI}^{DL-CT} = 4$ for Cell#0, $V_{DAI}^{DL-CT} = 5$ for Cell#6, $V_{DAI}^{DL-CT} = 6$ for Cell#7 -

SF#2: $V_{DAI}^{DL-CT} = 7$ for Cell#5, $V_{DAI}^{DL-CT} = 8$ for Cell#7 - $V_{DAI,T}^{DL-T} = 8$ SF#3: $V_{DAI}^{DL-CT} = 9$ for Cell#0, $V_{DAI}^{DL-CT} = 10$ for Cell#7 - $V_{DAI,T}^{DL-T} = 10$ SF#0: $V_{DAI}^{DL-C} = 1$ for Cell#2, $V_{DAI}^{DL-C} = 2$ for Cell#5, $V_{DAI}^{DL-C} = 3$ for Cell#7, $V_{DAI,T}^{DL-T} = 3$ SF#1: $V_{DAI}^{DL-C} = 1$ for Cell#3, $V_{DAI}^{DL-C} = 2$ for Cell#6, $V_{DAI}^{DL-C} = 3$ for Cell#7, $V_{DAI,T}^{DL-T} = 6$ SF#2: $V_{DAI}^{DL-C} = 1$ for Cell#5, $V_{DAI}^{DL-C} = 2$ for Cell#7, $V_{DAI,T}^{DL-T} = 8$ SF#3: $V_{DAI}^{DL-C} = 1$ for Cell#3, $V_{DAI}^{DL-C} = 2$ for Cell#7, $V_{DAI,T}^{DL-T} = 10$ $V_{DAI}^{UL-CT} = 10$

| Cell#9 | Cell#9 | Cell#9 | Cell#9 |
| Cell#8 | Cell#8 | Cell#8 | Cell#8 |
| Cell#7 | Cell#7 | Cell#7 | Cell#7 |
| Cell#6 | Cell#6 | Cell#6 | Cell#6 |
| Cell#5 | Cell#5 | Cell#5 | Cell#5 |
| Cell#4 | Cell#4 | Cell#4 | Cell#4 |
| Cell#3 | Cell#3 | Cell#3 | Cell#3 |
| Cell#2 | Cell#2 | Cell#2 | Cell#2 |
| Cell#1 | Cell#1 | Cell#1 | Cell#1 |
| Cell#0 | Cell#0 | Cell#0 | Cell#0 |
| SF#0 | SF#1 | SF#2 | SF#3 |
| 2510 | 2520 | 2530 | 2540 |

FIGURE 25

SF#0: $V_{DAI}^{DL-CT} = 1$ for Cell#2, $V_{DAI}^{DL-CT} = 2$ for Cell#5, $V_{DAI}^{DL-CT} = 3$ for Cell#7

SF#1: $V_{DAI}^{DL-CT} = 4$ for Cell#3, $V_{DAI}^{DL-CT} = 5$ for Cell#6, $V_{DAI}^{DL-CT} = 6$ for Cell#7

SF#2: $V_{DAI}^{DL-CT} = 7$ for Cell#5, $V_{DAI}^{DL-CT} = 8$ for Cell#7

SF#3: $V_{DAI}^{DL-CT} = 9$ for Cell#3, $V_{DAI}^{DL-CT} = 10$ for Cell#7

$V_{DAI}^{UL-CT} = 10$

| Cell#9 | Cell#9 | Cell#9 | Cell#9 |
|---|---|---|---|
| Cell#8 | Cell#8 | Cell#8 | Cell#8 |
| Cell#7 | Cell#7 | Cell#7 | Cell#7 |
| Cell#6 | Cell#6 | Cell#6 | Cell#6 |
| Cell#5 | Cell#5 | Cell#5 | Cell#5 |
| Cell#4 | Cell#4 | Cell#4 | Cell#4 |
| Cell#3 | Cell#3 | Cell#3 | Cell#3 |
| Cell#2 | Cell#2 | Cell#2 | Cell#2 |
| Cell#1 | Cell#1 | Cell#1 | Cell#1 |
| Cell#0 | Cell#0 | Cell#0 | Cell#0 |
| SF#0 | SF#1 | SF#2 | SF#3 |
| 2610 | 2620 | 2630 | 2640 |

FIGURE 26

CODEWORD DETERMINATION FOR ACKNOWLEDGEMENT INFORMATION

CROSS-REFERENCE TO RELATED APPLICATION AND CLAIM OF PRIORITY

The present application claims priority under 35 U.S.C. § 119(e) to U.S. Provisional Patent Application Ser. No. 62/143,569 filed Apr. 6, 2015; U.S. Provisional Patent Application Ser. No. 62/145,267 filed Apr. 9, 2015; U.S. Provisional Patent Application Ser. No. 62/172,306 filed Jun. 8, 2015; and U.S. Provisional Patent Application Ser. No. 62/144,684 filed Apr. 8, 2015. The contents of the above-identified patent documents are incorporated herein by reference.

TECHNICAL FIELD

The present application relates generally to wireless communications and, more specifically, to determining a codeword of acknowledgement information in carrier aggregation operation.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus for determining a codeword of acknowledgement information in carrier aggregation operation.

In a first embodiment, a method includes receiving control signaling that conveys downlink control information (DCI) formats. Each of the DCI formats indicates scheduling for either a reception for a physical downlink shared channel (PDSCH) or a release for a semi-persistently scheduled (SPS) PDSCH in a transmission time interval (TTI) from a number of TTIs and on a cell from a number of cells. Each TTI has a TTI index and each cell has a cell index. Each of the DCI formats is associated with a cell index and with a TTI index for a respective PDSCH reception or SPS PDSCH release. Each of the DCI formats, when received in a first search space, includes a value for a counter downlink assignment indicator (DAI) field that counts DCI formats, first across cells from the number of cells according to an ascending cell index and then across TTIs from the number of TTIs according to an ascending TTI index, until the index of the TTI and the index of the cell associated with the DCI format. Each of the DCI formats, when received in a second search space, includes a value for a total DAI field that counts DCI formats across all cells and across TTIs from the number of TTIs according to an ascending TTI index until the index of the TTI associated with the DCI format. The method additionally includes generating acknowledgement information bits in response to receiving the PDSCHs or the SPS PDSCH release. The method also includes transmitting the acknowledgement information bits.

In a second embodiment, a UE includes a receiver, a controller, and a transmitter. The receiver is configured to receive control signaling that conveys DCI formats. Each of the DCI formats indicates scheduling for either a reception for a PDSCH or a release for a SPS PDSCH in a TTI from a number of TTIs and on a cell from a number of cells. Each TTI has a TTI index and each cell has a cell index. Each of the DCI formats is associated with a cell index and with a TTI index for a respective PDSCH reception or SPS PDSCH release. Each of the DCI formats, when received in a first search space, includes a value for a counter DAI field that counts DCI formats, first across cells from the number of cells according to an ascending cell index and then across TTIs from the number of TTIs according to an ascending TTI index, until the index of the TTI and the index of the cell associated with the DCI format. Each DCI format, when received in a second search space, includes a value for a total DAI field that counts DCI formats across all cells and across TTIs from the number of TTIs according to an ascending TTI index until the index of the TTI associated with the DCI format. The controller is configured to generate acknowledgement information bits in response to the reception of the PDSCHs or the SPS PDSCH release. The transmitter is configured to transmit the acknowledgement information bits.

In a third embodiment, a base station includes a transmitter and a receiver. The transmitter is configured to transmit control signaling that conveys DCI formats. Each of the DCI format indicates scheduling for either a transmission for a PDSCH or a release for a SPS PDSCH in a TTI from a number of TTIs and on a cell from a number of cells. Each TTI has a TTI index and each cell has a cell index. Each of the DCI formats is associated with a cell index and with a TTI index for a respective PDSCH transmission or SPS PDSCH release. Each of the DCI formats, when transmitted in a first search space, includes a value for a counter DAI field that counts DCI formats, first across cells from the number of cells according to an ascending cell index and then across TTIs from the number of TTIs according to an ascending TTI index, until the index of the TTI and the index of the cell associated with the DCI format. Each of the DCI formats, when transmitted in a second search space, includes a value for a total DAI field that counts DCI formats across all cells and across TTIs from the number of TTIs according to an ascending TTI index until the index of the TTI associated with the DCI format. The receiver is configured to receive acknowledgement information bits in response to the transmission of the PDSCHs or of the SPS PDSCH release.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18 illustrates a combined functionality of a relative counter DAI and of a total counter DAI according to this disclosure;

FIG. 19 illustrates a determination and arrangement for a HARQ-ACK information payload using a counter DAI for a TDD system according to this disclosure;

FIG. 20 illustrates a determination and arrangement for a HARQ-ACK information payload using a value of a counter DAI and a value of a total DAI for a TDD system according to this disclosure;

FIG. 25 illustrates a determination and arrangement of HARQ-ACK information in a PUSCH using a counter DAI value and a total DAI value in a DL DCI format scheduling a PDSCH transmission and a DAI value in an UL DCI format scheduling a PUSCH transmission for a TDD system according to this disclosure; and FIG. 26 illustrates a determination and arrangement for a HARQ-ACK information payload transmission in a PUSCH using a counter DAI value in a DL DCI format scheduling a PDSCH transmission and a DAI value in an UL DCI format scheduling a PUSCH transmission for a TDD system according to this disclosure.

DETAILED DESCRIPTION

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein: 3GPP TS 36.211 v12.4.0, "E-UTRA, Physical channels and modulation" (REF 1); 3GPP TS 36.212 v12.3.0, "E-UTRA, Multiplexing and Channel coding" (REF 2); 3GPP TS 36.213 v12.4.0, "E-UTRA, Physical Layer Procedures" (REF 3); 3GPP TS 36.331 v12.4.0, "E-UTRA. Radio Resource Control (RRC) Protocol Specification" (REF 4); U.S. Pat. No. 8,588,259, entitled "Multiplexing Large Payloads of Control Information from User Equipments" (REF 5); and U.S. Pat. No. 8,837,450, entitled "Transmission of HARQ Control Information from a User Equipment for Downlink Carrier Aggregation" (REF 6).

One or more embodiments of the present disclosure relate to determining a codeword of acknowledgement information in carrier aggregation (CA) operation. A wireless communication network includes a downlink (DL) that conveys signals from transmission points, such as base stations or enhanced NodeBs (eNBs), to UEs. The wireless communication network also includes an uplink (UL) that conveys signals from UEs to reception points, such as eNBs.

Figure 1:
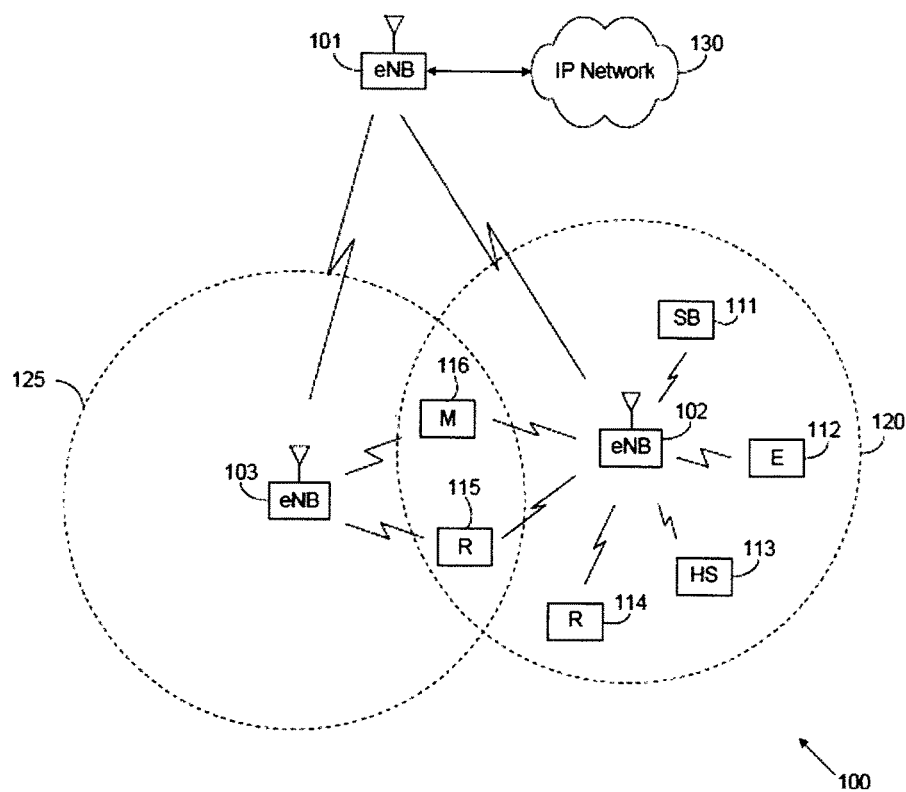
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 114, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 114. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100 and support transmission or reception of acknowledgement information in CA operation.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly between them or with the network 130 and provide UEs with direct wireless broadband access to the network 130. Further, the eNB 101, 102, and/or 103 could provide access to other or additional external networks, such as external telephone networks or other types of data networks.

Figure 2:
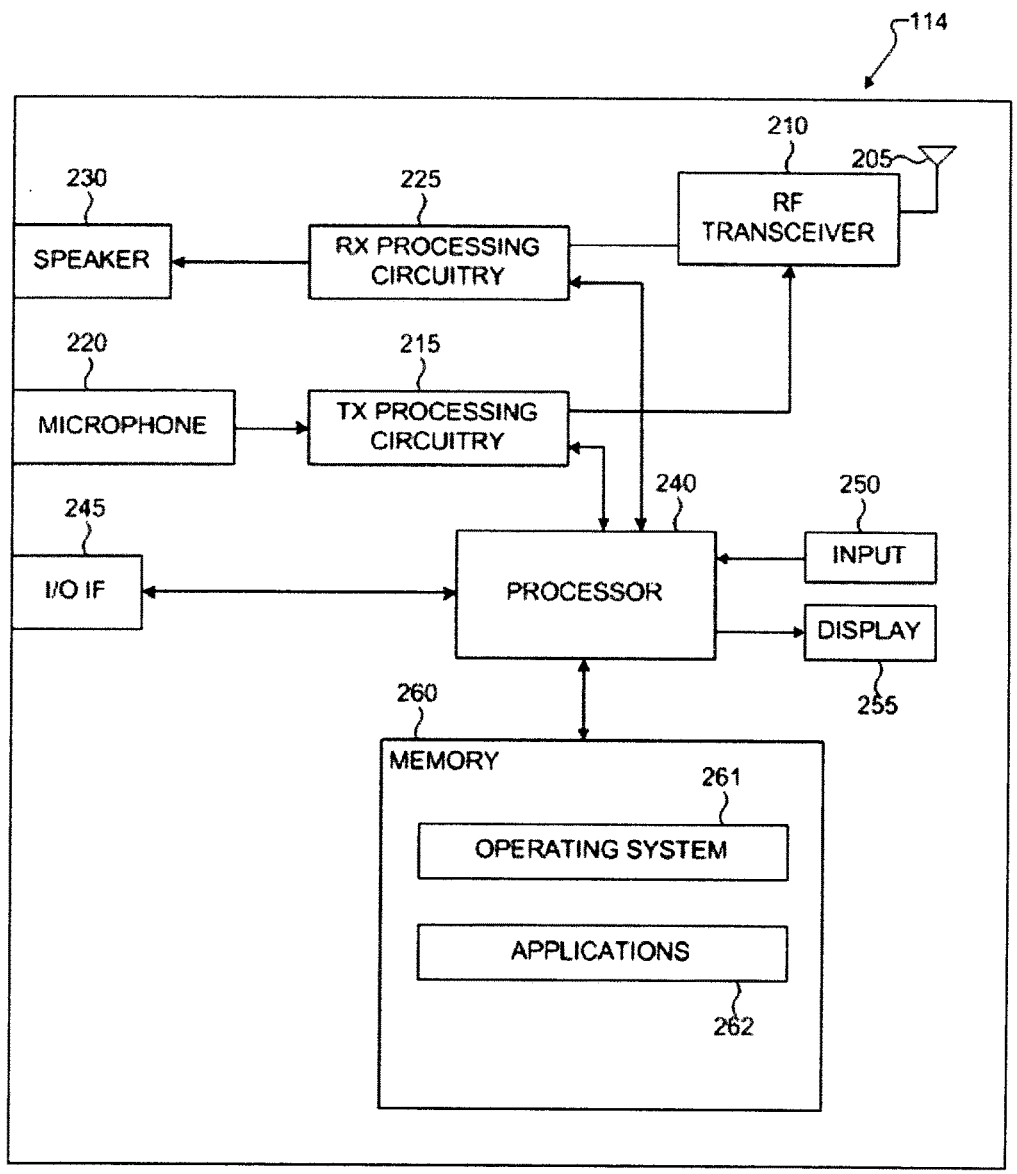
FIG. 2 illustrates an example UE according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230

(such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processing devices and can execute the OS program 261 stored in the memory 260 in order to control the overall operation of the UE 114. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from eNBs, other UEs, or an operator. The processor 240 is also coupled to the I/O interface 245, which provides the UE 114 with the ability to connect to other devices such as laptop computers and handheld computers. The I/O interface 245 is the communication path between these accessories and the processor 240.

The processor 240 is also coupled to the input 250 (e.g., touchscreen, keypad, etc.) and the display 255. The operator of the UE 114 can use the input 250 to enter data into the UE 114. The display 255 may be a liquid crystal display or other display capable of rendering text and/or at least limited graphics, such as from web sites. The display 255 could also represent a touch-screen.

The memory 260 is coupled to the processor 240. Part of the memory 260 could include a control or data signaling memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support transmission of acknowledgement information in CA operation.

Although FIG. 2 illustrates one example of UE 114, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
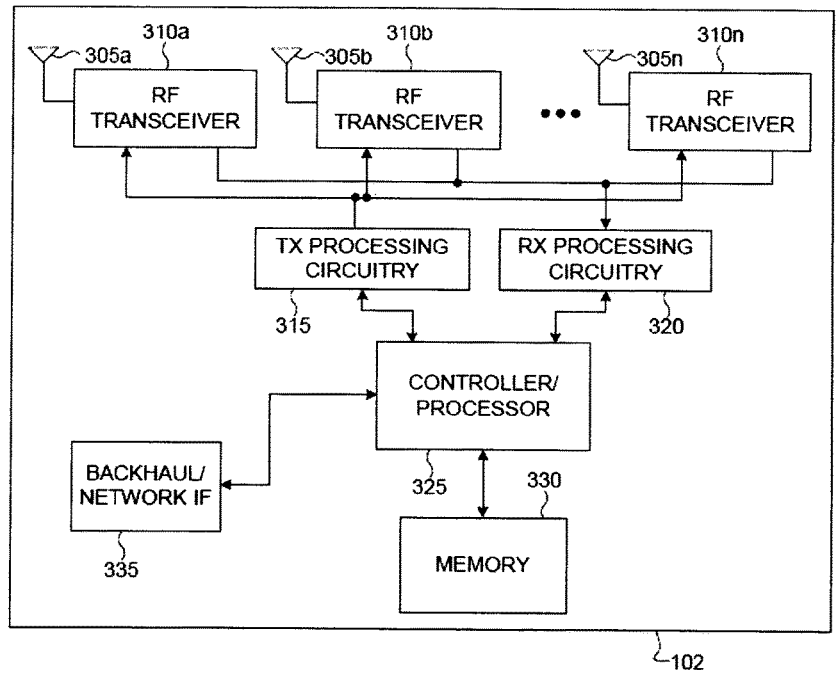
FIG. 3 illustrates an example eNB according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as an OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs, such as eNB 103, over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support reception of acknowledgement information in CA operation.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals can include data signals conveying information content, control signals conveying DL control information (DCI), and reference signals (RS) that are also known as pilot signals. An eNB, such as eNB 102, can transmit one or more of multiple types of RS, including UE-common RS (CRS), channel state information RS (CSI-RS), and demodulation RS (DMRS). A CRS can be transmitted over a DL system bandwidth (BW) and can be used by a UE, such as UE 114, to demodulate data or control signals or to perform measurements. To reduce CRS overhead, eNB 102 can transmit a CSI-RS with a smaller density in the time domain than a CRS (see also REF 1 and REF 3). UE 114 can use either a CRS or a CSI-RS to perform measurements and a selection can be based on a transmission mode (TM) UE 114 is configured by eNB 102 for physical DL shared channel (PDSCH) reception (see also REF 3). Finally, UE 114 can use a DMRS to demodulate data or control signals. The eNB 102 transmits data information to UE 114 through a PDSCH. The eNB 102 transmits control information to UE 114 through a physical DL control channel (PDCCH) or through an enhanced PDCCH (EPDCCH). Unless otherwise explicitly mentioned, only PDCCH will be referred to in the following but the descriptions are also applicable for EPDCCH.

In some wireless networks, UL signals can include data signals conveying information content, control signals conveying UL control information (UCI), and RS. A UE, such as UE 114, can transmit data information or UCI through a respective physical UL shared channel (PUSCH) or a physical UL control channel (PUCCH) to an eNB, such as eNB 102. The transport channel transferring information from a PUSCH to higher layers is referred to as UL shared channel (UL-SCH). When UE 114 simultaneously transmits data information and UCI, UE 114 can multiplex both in a PUSCH or simultaneously transmit data information and possibly some UCI in a PUSCH and transmit some or all UCI in a PUCCH. UCI can include hybrid automatic repeat request acknowledgement (HARQ-ACK) information indicating correct or incorrect detection of data transport blocks (TBs) in respective PDSCHs, scheduling request (SR) information indicating to eNB 102 whether UE 114 has data in its buffer, and channel state information (CSI) enabling eNB 102 to select appropriate parameters for PDSCH or PDCCH transmissions to UE 114. HARQ-ACK information can include a positive acknowledgement (ACK) in response to a correct PDCCH or data TB detection, a negative acknowledgement (NACK) in response to incorrect data TB detection, and an absence of PDCCH detection (DTX) that can be implicit or explicit. A DTX can be implicit when UE 114 does not transmit a HARQ-ACK signal. It is also possible to represent NACK and DTX with a same NACK/DTX state in the HARQ-ACK information (see also REF 3).

UL RS can include DMRS and sounding RS (SRS). UE 114 transmits a DMRS only in a BW of a respective PUSCH or PUCCH and eNB 102 can use a DMRS to demodulate information in a PUSCH or PUCCH. UE 114 transmits a SRS in order to provide eNB 102 with a UL CSI (see also REF 2 and REF 3). A DMRS is constructed by a constant amplitude zero autocorrelation (CAZAC) sequence such as a Zadoff-Chu (ZC). UE 114 applies a cyclic shift (CS) and an orthogonal covering code (OCC) to a DMRS transmission in the two slots of a SF.

The eNB 102 can schedule a PDSCH transmission to UE 114 either dynamically, by transmitting a DL DCI format in a PDCCH, or semi-statically by RRC signaling. The eNB 102 can schedule a PUSCH transmission from UE 114 either dynamically, by transmitting an UL DCI format in a PDCCH, or semi-statically by RRC signaling. DCI formats can also provide other functionalities (see also REF 2). For example, a DCI format 3/3A can be used to convey to a group of UEs respective power control commands for adjusting a respective PUSCH transmission power or a PUCCH transmission power. UE 114 detects a PDCCH conveying a DCI format through decoding operation in a common search space (CSS), such as for a DCI format 3/3A, or in a UE-specific search space (USS) see also REF 3. For some DCI formats, such as a DCI format 1A, a respective PDCCH can be transmitted either in a CSS or in a USS. An EPDCCH can be transmitted only in a USS (see also REF 3).

A transmission time interval (TTI) for DL signaling or for UL signaling is one subframe (SF). For example, a SF duration can be one millisecond (msec). A unit of 10 SFs, indexed from 0 to 9, is referred to as a system frame. In a time division duplex (TDD) system, a communication direction in some SFs is in the DL, and a communication direction in some other SFs is in the UL.

Figure 4:
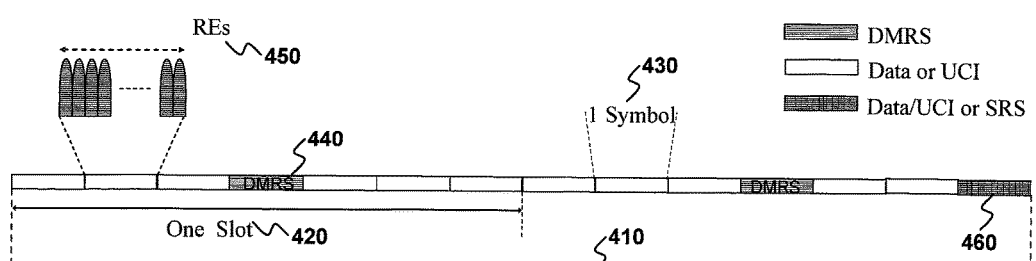
FIG. 4 illustrates an example UL SF structure for PUSCH transmission or PUCCH transmission according to this disclosure.

FIG. 4 illustrates an example UL SF structure for PUSCH transmission or PUCCH transmission according to this disclosure. The embodiment of the UL SF structure shown in FIG. 4 is for illustration only. Other embodiments could be used without departing from the scope of the present disclosure.

UL signaling can use Discrete Fourier Transform Spread OFDM (DFT-S-OFDM). An UL SF 410 includes two slots. Each slot 420 includes $N_{symb}^{UL}$ symbols 430 where UE 114 transmits data information, UCI, or RS including one symbol per slot where UE 114 transmits DMRS 440. A transmission BW includes frequency resource units that are referred to as resource blocks (RBs). Each RB includes $N_{sc}^{RB}$ (virtual) sub-carriers that are referred to as resource elements (REs). A transmission unit of one RB over one slot is referred to as a physical RB (PRB) and transmission unit of one RB over one SF is referred to as a PRB pair. UE 114 is assigned $M_{PUXCH}$ RBs for a total of $M_{sc}^{PUXCH} = M_{PUXCH} \cdot N_{sc}^{RB}$ REs 450 for a PUSCH transmission BW ('X'='S') or for a PUCCH transmission BW ('X'='C'). A last SF symbol can be used to multiplex SRS transmissions 460 from one or more UEs. A number of UL SF symbols available for data/UCI/DMRS transmission is $N_{symb}^{PUXCH}=2\cdot(N_{symb}^{UL}-1)\cdot N_{SRS}$, $N_{SRS}=1$ when a last SF symbol supports SRS transmissions from UEs that overlap at least partially in BW with a PUXCH transmission BW; otherwise, $N_{SRS}=0$. Therefore, a number of total REs for a PUXCH transmission is $M_{sc}^{PUXCH}\cdot N_{symb}^{PUXCH}$.

When the structure in FIG. 4 is used to transmit UCI (HARQ-ACK or P-CSI with or without SR) in a PUCCH, there is no data information included and UCI can be mapped over all REs except for REs used to transmit DMRS or SRS.

Figure 5:
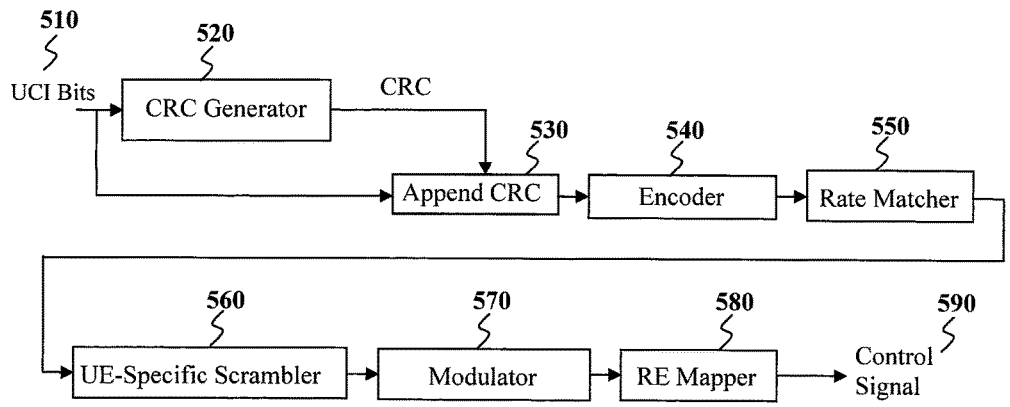
FIG. 5 illustrates an example encoding and modulation process for UCI according to this disclosure.

FIG. 5 illustrates an example encoding and modulation process for UCI according to this disclosure. The embodiment of the encoding process shown in FIG. 5 is for illustration only. Other embodiments could be used without departing from the scope of the present disclosure.

Upon determining that a number $O_{UCI,0}$ of UCI bits is larger than a predetermined value, a UE 114 controller (not shown) provides the UCI bits 510 to a cyclic redundancy check (CRC) generator 520 that computes a CRC for the $O_{UCI,0}$ UCI bits and appends $O_{CRC}$ CRC bits, such as 8 CRC bits, to the $O_{UCI,0}$ UCI bits to result $O_{UCI}$ UCI and CRC bits 530. An encoder 540, such as a tail biting convolutional code (TBCC), encodes the output of $O_{UCI}$ bits. A rate matcher 550 performs rate matching to allocated resources, followed by a scrambler 560 to perform scrambling, a modulator 570 to modulate the encoded bits, for example using QPSK, an RE mapper 580, and finally a transmitter for a transmission of a control signal 590.

Figure 6:
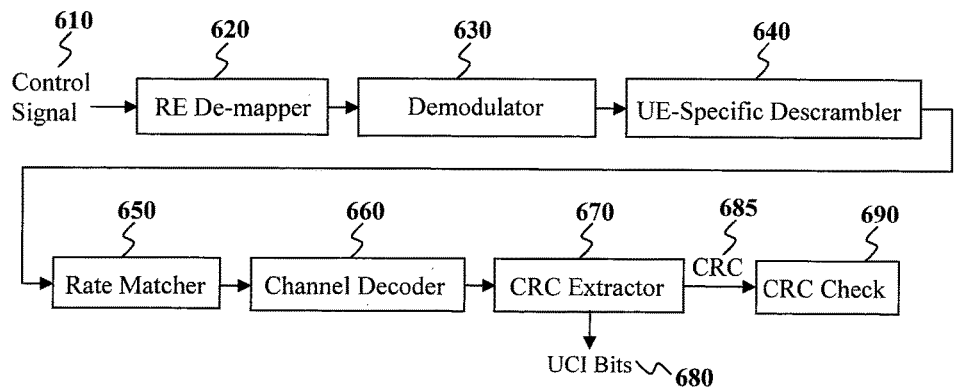
FIG. 6 illustrates an example demodulation and decoding process for UCI according to this disclosure.

FIG. 6 illustrates an example demodulation and decoding process for UCI according to this disclosure. The embodiment of the decoding process shown in FIG. 6 is for illustration only. Other embodiments could be used without departing from the scope of the present disclosure.

The eNB 102 receives a control signal 610 that is provided to a RE demapper 620 to perform RE demapping, a demodulator 630 to perform demodulation for a corresponding modulation scheme, a descrambler 640 to perform descrambling, a rate matcher 650 to perform rate matching, and a decoder 660, such as a TBCC decoder, to perform decoding and provide $O_{UCI}$ UCI and CRC bits. A CRC extraction unit 670 separates $O_{UCI,0}$ UCI bits 680 and $O_{CRC}$ CRC bits 685, and a CRC checking unit 690 computes a CRC check (whether a CRC checksum is zero for a positive CRC check or non-zero for a negative CRC check). When the CRC check passes (CRC checksum is zero), eNB 102 determines that the UCI is valid.

The eNB 102 can use a same transmitter structure for transmitting a DCI format as UE 114 can use for transmitting UCI in FIG. 5. With respect to FIG. 5, UCI can be replaced by DCI format and a UE-specific scrambler can be replaced by a cell-specific scrambler. Similar, UE 114 can use a same receiver structure for receiving a DCI format as eNB 102 can use for receiving UCI in FIG. 6. With respect to FIG. 6, UCI can be replaced by DCI format and a UE-specific descrambler can be replaced by a cell-specific descrambler. Respective descriptions of an eNB 102 transmitter structure and of a UE 114 receiver structure for a DCI format are omitted for brevity.

Figure 7:
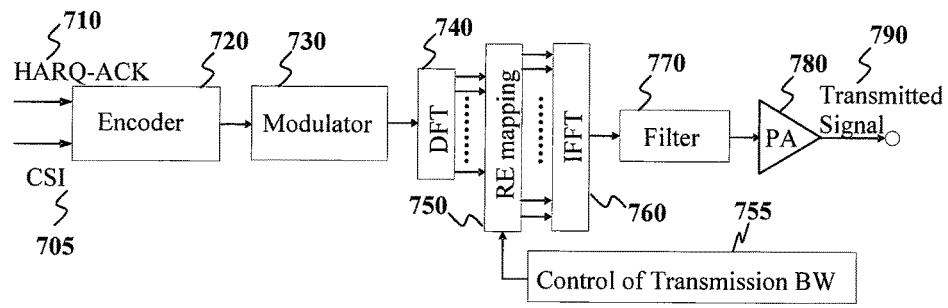
FIG. 7 illustrates an example UE transmitter for a PUCCH having a same SF structure as a PUSCH according to this disclosure.

FIG. 7 illustrates an example UE transmitter for a PUCCH having a same SF structure as a PUSCH according to this disclosure. The embodiment of the transmitter shown in FIG. 7 is for illustration only. Other embodiments could be used without departing from the scope of the present disclosure.

UCI bits from UE 114, such as $O_{P\text{-}CSI}$ P-CSI information bits 705, when any, and $O_{HARQ\text{-}ACK}$ HARQ-ACK information bits 710, when any, but also a SR bit in a SF configured to UE 114 for SR transmission (not shown), are jointly encoded by encoder 720. The encoder can be a TBCC or turbo coding (TC) and CRC bits are included in each encoded codeword (see also REF 2). Encoded bits are subsequently modulated by modulator 730. A discrete Fourier transform (DFT) is obtained by DFT unit 740, REs 750 corresponding to a PUCCH transmission BW are selected by selector 755, an inverse fast Fourier transform (IFFT) is performed by IFFT unit 760, an output is filtered and by filter 770, a processor applies a power according to a power control procedure to power amplifier (PA) 780, and a transmitter 790 transmits a signal. Due to the DFT mapping, the REs can be viewed as virtual REs but are referred to as REs for simplicity. For brevity, additional transmitter circuitry such as digital-to-analog converter, filters, amplifiers, and transmitter antennas as well as encoders and modulators for data symbols and UCI symbols are omitted.

A UE transmitter block diagram for data in a PUSCH can be obtained as in FIG. 7 by replacing HARQ-ACK information and CSI with data information.

Figure 8:
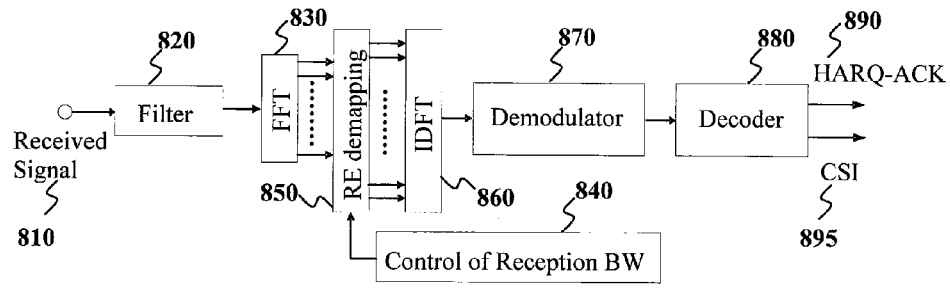
FIG. 8 illustrates an example eNB receiver for a PUCCH having a same SF structure as a PUSCH according to this disclosure.

FIG. 8 illustrates an example eNB receiver for a PUCCH having a same SF structure as a PUSCH according to this disclosure. The embodiment of the receiver shown in FIG. 8 is for illustration only. Other embodiments could be used without departing from the scope of the present disclosure.

A received signal 810 is filtered by filter 820, a fast Fourier transform (FFT) is applied by FFT unit 830, a selector unit 840 selects REs 850 used by a transmitter, an inverse DFT (IDFT) unit applies an IDFT 860, a demodulator 870 demodulates the IDFT output using a channel estimate provided by a channel estimator (not shown), and finally a decoder 880 outputs $O_{HARQ\text{-}ACK}$ HARQ-ACK information bits 890, when any, and $O_{P\text{-}CSI}$ CSI information bits 895, when any, and a SR bit (not shown), when any. Additional receiver circuitry such as a channel estimator, demodulators and decoders for data and UCI symbols are not shown for brevity.

An eNB receiver block diagram for data in a PUSCH can be obtained as in FIG. 8 by replacing HARQ-ACK information and CSI with data information.

For transmission of HARQ-ACK information payloads up to 22 bits, or for joint transmission of HARQ-ACK information and single-cell CSI with total payload up to 22 bits, a PUCCH format 3 (see also REF 1 and REF 3) can be used and a payload of $O_{HARQ\text{-}ACK}$ HARQ-ACK bits, or a payload of $O_{HARQ\text{-}ACK}$ HARQ-ACK bits and $O_{CSI}$ CSI bits, can be encoded using a block code. Considering for brevity in the following only the case of HARQ-ACK bits, the block code can be a $(32, O_{HARQ\text{-}ACK})$ Reed-Mueller (RM) code.

Figure 9:
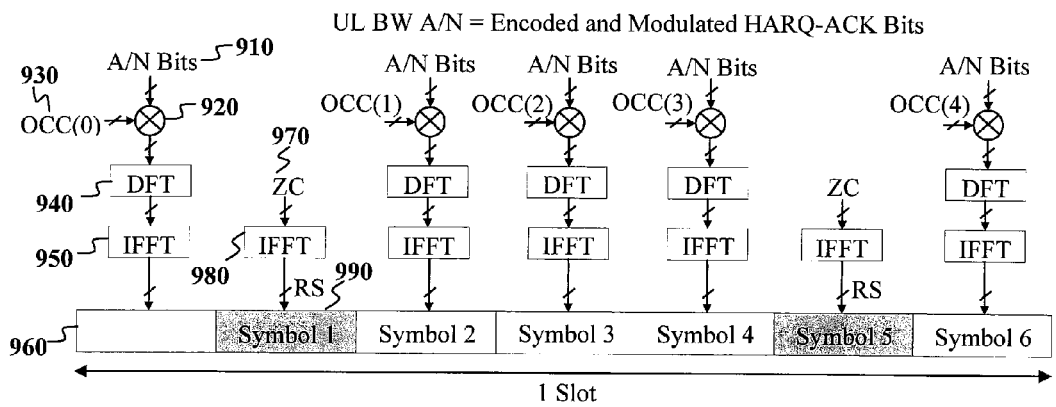
FIG. 9 illustrates a structure for a PUCCH format 3 over one SF slot for transmission of HARQ-ACK information according to this disclosure.

FIG. 9 illustrates a structure for a PUCCH format 3 over one SF slot for transmission of HARQ-ACK information according to this disclosure.

After encoding and modulation using respectively, for example, a $(32, O_{HARQ\text{-}ACK})$ RM code punctured to a $(24, O_{HARQ\text{-}ACK})$ RM code (see also REF 2) and QPSK) modulation (not shown for brevity), a set of same HARQ-ACK bits 910 is multiplied 920 with elements of an OCC 930 and is subsequently precoded by a DFT filter 940. For example, for 5 symbols per slot used to transmit HARQ-ACK bits, the OCC has length 5 {OCC(0), OCC(1), OCC(2), OCC(3), OCC(4)} and can be either of {1, 1, 1, 1, 1}, or {1, $\exp(j2\pi/5)$, $\exp(j4\pi/5)$, $\exp(j6\pi/5)$, $\exp(j8\pi/5)$}, or {1, $\exp(j4\pi/5)$, $\exp(j8\pi/5)$, $\exp(j2\pi/5)$, $\exp(j6\pi/5)$}, or {1, $\exp(j6\pi/5)$, $\exp(j2\pi/5)$, $\exp(j8\pi/5)$, $\exp(j4\pi/5)$}, or {1, $\exp(j8\pi/5)$, $\exp(j6\pi/5)$, $\exp(j4\pi/5)$, $\exp(j2\pi/5)$}. The output is passed through an IFFT 950 and then mapped to a SF symbol 960. The previous operations are linear and their relative order can be inter-changed. As PUCCH format 3 is transmitted over one PRB pair, 24 encoded HARQ-ACK bits are transmitted in each slot and they are mapped to 12 QPSK symbols in respective 12 REs. Same or different HARQ-ACK bits can be transmitted in the second slot of a SF. RS is also transmitted in each slot to enable coherent demodulation of HARQ-ACK signals. A RS is constructed from a length-12 CAZAC sequence (see also REF 1) 970 that is passed through an IFFT filter 980 and mapped to another SF symbol 990. Multiplexing of RS from different UEs is achieved by using different CS of a same ZC sequence.

The structure in FIG. 9 can support a limited payload of HARQ-ACK information bits without incurring a large coding rate. For a HARQ-ACK payload between 12 and 22 bits, a dual RM code can be used where a mapping to successive elements of a DFT can alternate between elements from an output of a first RM code and elements from an output of a second RM code in a sequential manner (not shown for brevity see also REF 2).

Figure 10:
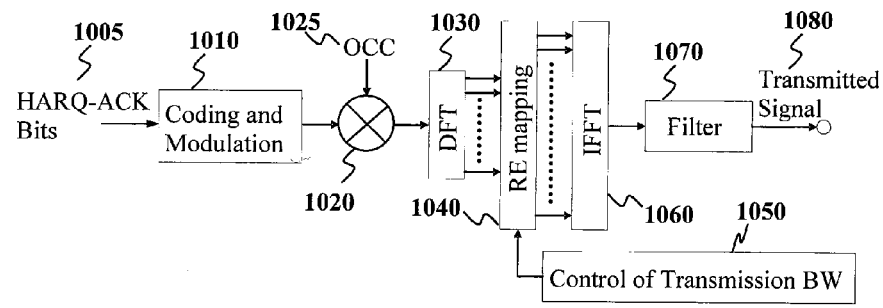
FIG. 10 illustrates a UE transmitter block diagram for HARQ-ACK information using a PUCCH format 3 according to this disclosure.

FIG. 10 illustrates a UE transmitter block diagram for HARQ-ACK information using a PUCCH format 3 according to this disclosure. The embodiment of the transmitter shown in FIG. 10 is for illustration only. Other embodiments could be used without departing from the scope of the present disclosure.

HARQ-ACK information bits 1005 are encoded and modulated 1010 and then multiplied 1020 with an OCC element 1025 for a respective DFT-S-OFDM symbol. After DFT precoding by filter 1030, REs 1040 of an assigned PRB pair are selected 1050, an IFFT is performed 1060 and finally filtering 1070 is applied and a signal is transmitted 1080. For brevity, additional transmitter circuitry such as RS transmission, CP insertion, digital-to-analog converter, analog filters, amplifiers, and transmitter antennas are not shown.

Figure 11:
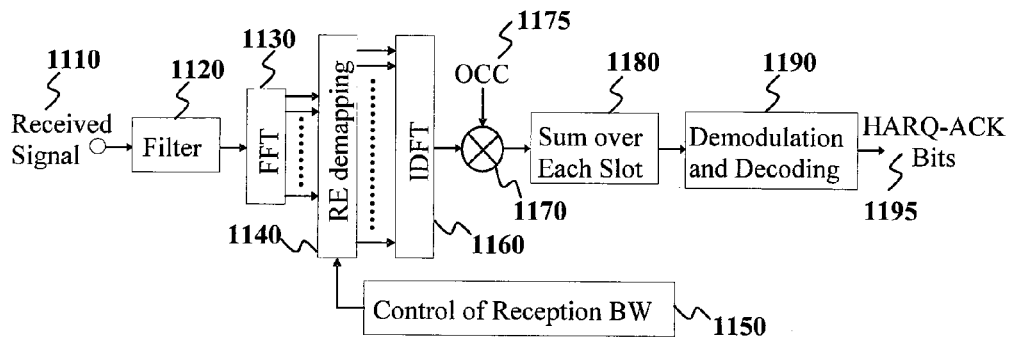
FIG. 11 illustrates an eNB receiver block diagram for receiving HARQ-ACK information in a PUCCH format 3 according to this disclosure.

FIG. 11 illustrates an eNB receiver block diagram for receiving HARQ-ACK information in a PUCCH format 3 according to this disclosure. The embodiment of the receiver shown in FIG. 11 is for illustration only. Other embodiments could be used without departing from the scope of the present disclosure.

A received signal 1110 is filtered by filter 1120, followed by FFT filter 1130, RE selector 1140 selects REs 1150, filter 1160 applies an IDFT, multiplier 1170 multiplies an OCC element 1175 for a respective PUCCH format 3 SF symbol, summer 1180 sums the outputs for PUCCH format 3 SF symbols conveying HARQ-ACK signals over each slot, and demodulator and decoder 1190 demodulate and decode, respectively the HARQ-ACK symbols to obtain HARQ-ACK information bits 1195. Well known receiver functionalities such as analog filtering, CP extraction, and RS reception and channel estimation are not shown for brevity.

When UE 114 transmits $O_{HARQ-ACK}$ HARQ-ACK information in a PUSCH that conveys one data TB, UE 114 determines a number of coded modulation symbols per layer Q' for HARQ-ACK as being inversely proportional to a modulation and coding scheme (MCS) for data transmission, or when a modulation for HARQ-ACK information is fixed to QPSK, to a number of coded data symbols as in Equation 1 (see also REF 2)

$$Q' = \min(M_{RE}^{req}, 4 \cdot M_{sc}^{PUSCH}) \quad (1)$$

where $$M_{RE}^{req} = \left\lceil \frac{O_{HARQ-ACK} \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, \quad (2)$$

$\beta_{offset}^{PUSCH}$ is configured by eNB 102 to UE 114, the remaining terms in Equation 2 are as defined in REF 2, and ⌈ ⌉ is a ceiling function that rounds a number to a smallest integer that is equal to or larger than the number. When UE 114 transmits HARQ-ACK information in a PUSCH that conveys two data TBs, UE 114 determines a number of coded modulation symbols per layer Q' as described in REF 2 and additional description is omitted for brevity.

In a TDD communication system, a communication direction in some SFs is in the DL, and a communication direction in some other SFs is in the UL. Table 1 lists indicative UL/DL configurations over a period of 10 SFs that is also referred to as frame period. "D" denotes a DL SF, "U" denotes an UL SF, and "S" denotes a special SF that includes a DL transmission field referred to as DwPTS, a guard period (GP), and a UL transmission field referred to as UpPTS. Several combinations exist for a duration of each field in a special SF subject to the condition that the total duration is one SF (see also REF 1).

TABLE 1

| TDD UL/DL configurations | | | | | | | | | | | |
|---|---|---|---|---|---|---|---|---|---|---|---|
| TDD UL-DL Configuration | DL-to-UL Switch-point periodicity | SF number | | | | | | | | | |
| | | 0 | 1 | 2 | 3 | 4 | 5 | 6 | 7 | 8 | 9 |
| 0 | 5 msec | D | S | U | U | U | D | S | U | U | U |
| 1 | 5 msec | D | S | U | U | D | D | S | U | U | D |
| 2 | 5 msec | D | S | U | D | D | D | S | U | D | D |
| 3 | 10 msec | D | S | U | U | U | D | D | D | D | D |
| 4 | 10 msec | D | S | U | U | D | D | D | D | D | D |
| 5 | 10 msec | D | S | U | D | D | D | D | D | D | D |
| 6 | 5 msec | D | S | U | U | U | D | S | U | U | D |

In a TDD system, a HARQ-ACK signal transmission from UE 114 in response to PDSCH receptions in multiple DL SFs can be transmitted in a same UL SF. A number $M_W$ of DL SFs having associated HARQ-ACK signal transmissions from UE 114 in a same UL SF is referred to as a DL association set or as a bundling window of size $M_W$. A DL DCI format scheduling a PDSCH transmission (or an SPS PDSCH release) includes a DL assignment index (DAI) field of two binary elements (bits) that provides a counter indicating a number of DL DCI formats, modulo 4, transmitted to UE 114 in a bundling window up to the SF of the DL DCI format detection (see also REF 2 and REF 3). Table 2 indicates DL SFs n−k, where k∈K, that UE 114 transmits an associated HARQ-ACK signal in UL SF n. These DL SFs represent a bundling window for a respective UL SF.

TABLE 2

| Downlink association set index K: {k₀, k₁, . . . k_{M−1}} | | | | | | | | | | |
|---|---|---|---|---|---|---|---|---|---|---|
| TDD UL/DL Configuration | SF n | | | | | | | | | |
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

A DAI field having a value $V_{DAI}^{DL}$ is included in each DL DCI format scheduling a PDSCH transmission to UE 114.

As eNB 102 cannot predict whether or not eNB 102 will schedule a PDSCH transmission to UE 114 in a future SF, $V_{DAI}^{DL}$ is a relative counter that is incremented in DL DCI formats scheduling PDSCH transmissions to UE 114 in respective SFs of a bundling window. Then, for a DAI field that includes 2 bits, when UE 114 fails to detect up to 3 successive DL DCI formats scheduling PDSCH transmissions in respective SFs of a bundling window but UE 114 detects a DL DCI format scheduling a PDSCH transmission in a later SF of the bundling window, UE 114 can determine that UE 114 failed to detect the up to 3 successive DL DCI formats and UE 114 can provide a NACK/DTX indication for HARQ-ACK information for the up to 3 respective PDSCH transmissions. However, since $V_{DAI}^{DL}$ can only be a relative counter, when UE 114 fails to detect a DL DCI format scheduling a PDSCH transmission in a last SF within a bundling window, UE 114 has no means to identify the missed detection. This shortcoming can be circumvented by UE 114 providing HARQ-ACK information to eNB 102 regarding outcomes of PDSCH receptions for all SFs of a bundling window (see also REF 3).

One mechanism towards satisfying a demand for increased network capacity and data rates is network densification. This is realized by deploying small cells in order to increase a number of network nodes and their proximity to UEs and provide cell splitting gains. As a number of small cells increases and deployments of small cells become dense, a handover frequency and a handover failure rate can also significantly increase. By maintaining a RRC connection to the macro-cell, communication with the small cell can be optimized as control-place (C-place) functionalities such as mobility management, paging, and system information updates can be provided only by the macro-cell while a small-cell can be dedicated for user-data plane (U-plane) communications. When a latency of a backhaul link between network nodes (cells) is practically zero, CA can be used as in REF 3 and scheduling decisions can be made by a same eNB 102 and conveyed to each network node. Moreover, UCI from UE 114 can be received at any network node, except possibly for nodes using unlicensed spectrum, and conveyed to eNB 102 to facilitate a proper scheduling decision for UE 114.

Figure 12:
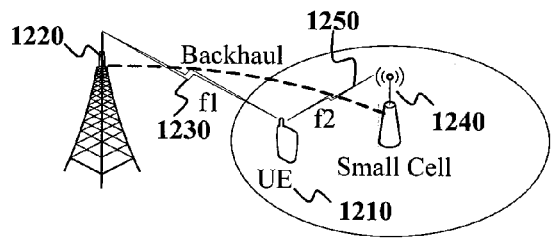
FIG. 12 illustrates a communication using CA according to this disclosure.

FIG. 12 illustrates a communication using CA according to this disclosure.

UE 114 1210, communicates with a first cell 1220 corresponding to a macro-cell using a first carrier frequency f1 1230 and with a second cell 1240 corresponding to a small cell over carrier frequency f2 1250. The first carrier frequency can correspond to a licensed frequency band and the second carrier frequency can correspond to an unlicensed frequency bad. The first cell and the second cell are controlled by eNB 102 and are connected over a backhaul that introduces negligible latency.

When UE 114 is configured with CA operation over a first number of DL cells and over a second number of UL cells, PDCCH transmissions in a CSS are only on a primary DL cell and PUCCH transmissions are only on a primary UL cell that is associated with the primary DL cell. Remaining, DL or UL, cells are referred to as secondary cells (see also REF 3). The eNB 102 configures UE 114 with indexes for respective secondary cells while the primary cell has index 0 (see also REF 5). The above functionalities can be parallelized for two cell groups (see also REF 3).

When UE 114 is configured with CA operation with up to 5 DL cells, HARQ-ACK transmission on a PUCCH typically uses a PUCCH format 3 (see also REF 1 and REF 3). For a TDD system, a PUCCH format 3 resource is determined from a transmission power control (TPC) command field in a DL DCI format with DAI value greater than '1' or with DAI value equal to '1' that is not the first DL DCI format that UE 114 detects within a bundling window. UE 114 assumes that a same PUCCH resource index value is transmitted in all DL DCI formats used to determine the PUCCH resource index value for a bundling window (see also REF 3). A functionality of a TPC command field in a DL DCI format with DAI value equal to '1' that is the first DL DCI format UE 114 detects in a bundling window remains unchanged and provides a TPC command value for UE 114 to adjust a transmission power for the PUCCH format 3. In this manner, a DAI field functions both as a counter of DL DCI formats transmitted to UE 114 within a bundling window and as an indicator whether a TPC command field in a DL DCI format provides either a TPC command value or an indicator to one PUCCH resource from a set of PUCCH resources configured to UE 114 (ARI).

When a DL DCI format is conveyed by an EPDCCH, the DL DCI format also includes a HARQ-ACK resource offset (HRO) field that either indicates a PUCCH resource for a PUCCH format 1a/1b transmission when the DL DCI format schedules PDSCH on a primary cell or is set to zero when the DL DCI format schedules PDSCH on a secondary cell (see also REF 2 and REF 3). Therefore, regardless of whether a DL DCI format scheduling a PDSCH transmission is conveyed by a PDCCH or an EPDCCH, UE 114 cannot obtain a TPC command to transmit associated HARQ-ACK information in a PUCCH when UE 114 does not detect a DL DCI format scheduling a PDSCH transmission on a primary cell.

Typical CA operation supports up to 5 DL cells each with a maximum of 20 MHz BW and, for UL/DL configuration 5 in TDD systems, for up to 2 DL cells (see also REF 3). This limitation on the number of DL cells that UE 114 can support limits DL data rates due to a respective limitation in a total DL BW. With an availability of unlicensed spectrum where many 20 MHz BW carriers can exist, a number of cells that can be configured to UE 114 can become significantly larger than 5. Therefore, extending support for CA beyond 5 DL cells can allow for more efficient utilization of available spectrum and improve DL data rates and service experience for UE 114. A consequence from increasing a number of DL cells relates to a need to support larger UCI payloads. A new PUCCH format that can accommodate large HARQ-ACK payloads or, in general, large UCI payloads can have a PUSCH-based structure (see also REF 5) and use TBCC or TC to encode UCI.

As accommodating large HARQ-ACK payloads requires more UL resources or higher transmission power, thereby increasing an associated overhead, or interference and UE power consumption, it is beneficial for a UE to be provided a capability to dynamically determine a HARQ-ACK payload, and accordingly select a PUCCH format or resources according to a predetermined association with the UCI payload instead of semi-statically determine the HARQ-ACK payload based on a number of configured DL cells and a configured PDSCH TM per each configured DL cell (see also REF 2 and REF 3). This can also be beneficial for reducing a resource overhead required for multiplexing HARQ-ACK in a PUSCH.

Embodiments of this disclosure provide mechanisms for a UE to determine a HARQ-ACK codeword. Embodiments of this disclosure also provide mechanisms for a UE to select a PUCCH format or PUCCH resources according to a predetermined association with a HARQ-ACK codeword size. Embodiments of this disclosure additionally provide mechanisms for introducing and utilizing DAI fields to determine and arrange HARQ-ACK information bits in a codeword for transmission in a PUCCH or in a PUSCH. Embodiments of this disclosure further provide mechanisms for an eNB to resolve possible error cases when a UE determines a HARQ-ACK codeword.

When eNB 102 configures a parameters to UE 114, unless otherwise explicitly mentioned, the configuration is by higher layer signaling, such as RRC signaling. When eNB 102 dynamically indicates a parameter to UE 114, the indication is by physical layer signaling such as by a DCI format.

In the following, for brevity and with a few exceptions, a SPS PDSCH transmission or a DL DCI format indicating SPS PDSCH release is not explicitly mentioned; UE 114 is assumed to include HARQ-ACK information for SPS PDSCH transmission or for a DL DCI format indicating SPS PDSCH release (see also REF 3). A DCI format indicating SPS PDSCH release includes a same set of DAI fields as a DCI format scheduling a PDSCH transmission. A DL DCI format refers to a DCI format scheduling a PDSCH transmission or a SPS PDSCH release and an UL DCI format refers to a DCI format scheduling a PUSCH transmission.

UE 114 is configured a group of cells for possible receptions of respective PDSCH transmissions (DL cells) for operation with CA. Each cell in the group of cells is identified by a UE-specific cell index that eNB 102 informs to UE 114 through higher layer signaling. For example, UE 114 can be configured with a group of C cells and respective cell indexes 0, 1, . . . , C−1. UE 114 generates one HARQ-ACK information bit in response to one DL DCI format detection when UE 114 is configured with HARQ-ACK spatial domain bundling or, for each cell from the group of C cells, with a PDSCH TM that enables transmission of only one data TB. UE 114 generates two HARQ-ACK information bits in response to a DL DCI format detection when UE 114 is not configured with spatial domain bundling and UE 114 is configured with a PDSCH TM that enables transmission of two data TB in at least one cell from the C cells. For brevity, unless explicitly mentioned, following descriptions consider that UE 114 generates one HARQ-ACK information bit in response to one DL DCI format detection.

The eNB 102 can also configure UE 114 with more than one cell for PUCCH transmission (UL cell), such as for example two UL cells. PUCCH transmission in a first UL cell is associated with a first group of DL cells and PUCCH transmission in a second UL cell is associated with a second group of DL cells. UE 114 transmits a PUCCH on a primary cell of a DL cell group. Unless otherwise explicitly noted, the descriptions in this disclosure are with respect to one group of DL cells and can be replicated per group of DL cells in case of more than one group of DL cells.

Selection of PUCCH Format or of PUCCH Resources for HARQ-ACK Transmission

UE 114 can select a PUCCH format or determine resources for a PUCCH format transmission based on an actual HARQ-ACK payload instead of a maximum HARQ-ACK payload that is determined from a number of cells that UE 114 is configured by eNB 102 and a configured PDSCH TM in each of the configured cells (see also REF 2 and REF 3).

UE 114 can use a first PUCCH format, such as PUCCH Format 3, to transmit up to a first number of HARQ-ACK information bits, such as 22 bits, and use a second PUCCH format, such as one based on a PUSCH structure, to transmit a number of HARQ-ACK information bits larger than the first number.

Figure 13:
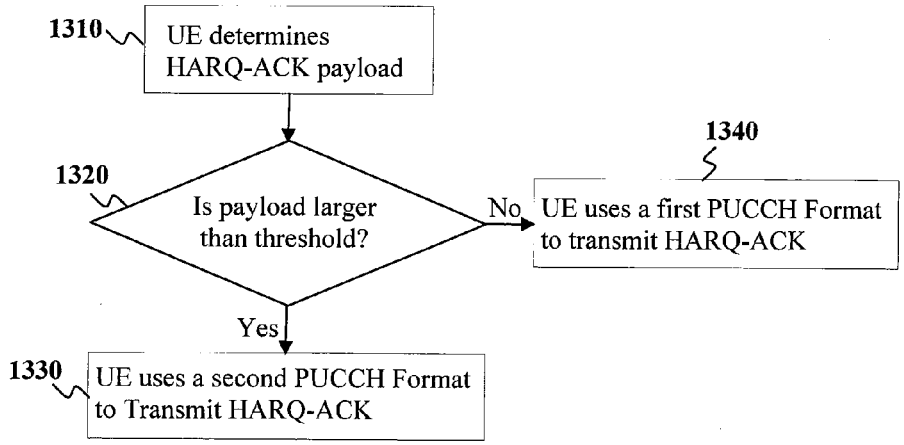
FIG. 13 illustrates a selection by a UE of a PUCCH format based on an associated HARQ-ACK codeword size according to this disclosure.

FIG. 13 illustrates a selection by a UE of a PUCCH format based on an associated HARQ-ACK codeword size according to this disclosure.

UE 114 is configured for CA operation and determines a HARQ-ACK information payload 1310. As subsequently described, a determination can be based on one or more DAI fields in respective one or more DL DCI formats scheduling respective one or more PDSCH transmissions (including an SPS PDSCH release) to UE 114 in respective one or more cells from a group of cells and, for a TDD system, in one or more SFs of a bundling window. UE 114 examines whether the HARQ-ACK payload is larger than a threshold 1320. The threshold can be predetermined in a system operation, such as 11 bits or 22 bits, or can be configured to UE 114 by eNB 102. When the HARQ-ACK payload is not larger than the threshold, UE 114 transmits the HARQ-ACK payload using a first PUCCH format 1330, such as PUCCH format 3. When the HARQ-ACK payload is larger than the threshold, UE 114 transmits the HARQ-ACK payload using a second PUCCH format 1340 such as one having the PUSCH SF structure (see also REF 5).

DAI Design for a FDD System

For a FDD system, UE 114 can determine a HARQ-ACK payload (HARQ-ACK codeword size) to transmit in a PUCCH based on a cell-domain DAI in DL DCI formats scheduling PDSCH transmissions or SPS PDSCH release in respective cells that UE 114 detects, and on SPS PDSCH transmissions to UE 114, when any, in a same SF.

In a first approach, a value $V_{DAI}^{DL-C}$ of a cell-domain DAI field in a DL DCI format can be a relative counter for a cell where UE 114 is scheduled a PDSCH transmission where the relative counter increments according to an ascending order of a cell index. For example, when UE 114 is configured with 32 cells for PDSCH transmissions, a DAI of 5 bits in a DL DCI format can provide an index of a respective cell where UE 114 is scheduled PDSCH transmission in a SF.

When UE 114 is configured for potential PDSCH transmissions in C cells, a cell-domain DAI size can be $\lceil \log_2 C \rceil$ bits. Alternatively, to have a same DL DCI format size regardless of a number of cells that UE 114 is configured PDSCH transmissions, a DAI size can be $\lceil \log_2 C_{max} \rceil$ bits where $C_{max}$ is a maximum number of cells in a system operation, such as 32 cells. When UE 114 is configured to receive PDSCH in $C < C_{max}$ cells, UE 114 can assume that a DL DCI format is not valid when the DL DCI format conveys a DAI value larger than C or UE 114 can assume that bits of a DAI field for DAI values corresponding to cell indexes larger than C are set to zero. For example, when UE 114 is configured to receive PDSCH in c≤16 cells and $C_{max}=32$, UE 114 can assume that a most significant bit (MSB) of the DAI is set to 0.

Although a DAI design according to the first approach can indicate a relative order of cells where UE 114 is scheduled PDSCH transmissions in a SF, the first approach requires a relatively large number of bits and UE 114 cannot determine whether UE 114 failed to detect DL DCI formats scheduling PDSCH transmissions in cells with indexes larger than a largest index of a cell that UE 114 detected a DL DCI format scheduling a PDSCH transmission.

In a second approach, to avoid having a large number of bits to represent a cell-domain DAI, a DAI value $V_{DAI}^{DL-C}$ can still be a relative counter according to a cell index for a transmitted DL DCI format but also rely on a sufficiently low probability that UE 114 fails to detect a number of DL DCI formats scheduling respective PDSCH transmissions in cells indicated by successive values $V_{DAI}^{DL-C}$. Assuming that UE 114 detects a DL DCI format that schedules a PDSCH transmission to UE 114 in a cell with index c and includes a DAI field with a first value $V_{DAI,1}^{DL-C}$, and that UE 114 detects a DL DCI format that schedules a PDSCH transmission to UE 114 in a cell with index c+j and includes a DAI field with a second value $V_{DAI,2}^{DL-C}=V_{DAI,1}^{DL-C}+1$, and UE 114 does not detect a DL DCI format scheduling a PDSCH transmission to UE 114 in cells with indexes between c and c+j, UE 114 can assume that there is no PDSCH transmission to UE 114 in any cell with index between c and c+j. In order to avoid any adverse effects on operation, a probability of the above assumption to be incorrect should be much smaller than a probability of incorrect HARQ-ACK detection at eNB 102. For example, assuming a probability of 1 e-2 that UE 114 fails to detect a DL DCI format, that this probability is independent for different DL DCI formats, and a probability of 1e-4 for incorrect HARQ-ACK detection at eNB 102, a probability that UE 114 fails to detect 4 DL DCI formats for cells with indexes between c and c+j is 1e-8 (when j≥4) and this probability is sufficiently smaller than the probability of 1e-4 for incorrect HARQ-ACK detection at eNB 102. Then, a cell-domain DAI field of 2 bits suffices and mapping can be as in Table 3.

TABLE 3

Value of Cell-Domain Relative Counter DAI

| DAI MSB, LSB | $V_{DAI}^{DL-C}$ | Number of DL Cells with PDSCH transmission and with PDCCH/EPDCCH indicating DL SPS release |
|---|---|---|
| 0, 0 | 1 | 1 or 5 or 9 or 13 or 17 or 21 or 25 or 29 |
| 0, 1 | 2 | 2 or 6 or 10 or 14 or 18 or 22 or 26 or 30 |
| 1, 0 | 3 | 3 or 7 or 11 or 15 or 19 or 23 or 27 or 31 |
| 1, 1 | 4 | 0 or 4 or 8 or 12 or 16 or 20 or 24 or 28 or 32 |

For example, when UE 114 detects a DL DCI format having a cell-domain relative counter DAI field with value $V_{DAI}^{DL-C}=2$ and scheduling PDSCH transmission in cell c and UE 114 detects a DL DCI format having a cell-domain DAI field value $V_{DAI}^{DL-C}=1$ and scheduling PDSCH transmission in cell c+j, where j>2, UE 114 can determine that UE 114 missed detecting two DL DCI formats scheduling respective PDSCH transmissions in cells with indexes between c and c+j. For example, when UE 114 detects a DL DCI format having a cell-domain relative counter DAI field with value $V_{DAI}^{DL-C}=2$ and scheduling a PDSCH transmission in cell c and detects a DL DCI format having a cell-domain relative counter DAI field with value $V_{DAI}^{DL-C}=3$ and scheduling a PDSCH transmission in cell c+j where j>0, UE 114 can determine that there was no DL DCI format scheduling a PDSCH transmission to UE 114 in cells with indexes between c and c+j. Therefore, for a cell-domain counter DAI field with value $V_{DAI}^{DL-C}$ mapping as in Table 3, UE 114 can determine whether UE 114 failed to detect up to three DL DCI formats scheduling respective PDSCH transmissions (or a SPS PDSCH release) in respective cells with indexes between an index of a first cell and an index of a second cell that UE 114 detects DL DCI formats scheduling respective PDSCH transmissions.

Regardless of a size of a cell-domain relative counter DAI field, an additional mechanism is needed to solve a problem of UE 114 not knowing whether UE 114 failed to detect DL DCI formats for one or more cells with larger indexes than a largest index of a cell that UE 114 detects a respective DL DCI format scheduling a PDSCH transmission in a same SF. This problem is similar to one for a TDD system where UE 114 cannot determine whether or not UE 114 failed to detect DL DCI formats transmitted in SFs of a bundling window that occur after a last SF within the bundling window where UE 114 detected a DL DCI format. However, unlike a TDD system where eNB 102 cannot predict future scheduling decisions in order to inform UE 114, eNB 102 knows a number of DL DCI formats that eNB 102 transmits to UE 114 in a SF and eNB 102 can additionally include either a total counter DAI field or a forward counter DAI field in the DL DCI format as is subsequently described.

A value $V_{DAI,F}^{DL-C}$ of a forward counter DAI field in a DL DCI format can indicate to UE 114 whether or not there are DL DCI formats scheduling PDSCH transmissions in cells with indexes larger than an index of a cell that the DL DCI format schedules a PDSCH transmission to UE 114. For example, the forward counter DAI can include 1 bit to indicate whether or not there is at least one more DL DCI format scheduling a PDSCH transmission in a cell with a larger index, or 2 bits to indicate whether there are 0, 1, 2, or 3 more DL DCI formats scheduling respective PDSCH transmissions in respective cells with larger indexes, and so on. Based on a value of a forward counter DAI in a DL DCI format that UE 114 detects and schedules a PDSCH transmission for a cell, UE 114 can determine whether or not UE 114 failed to detect up to three DL DCI formats that schedule PDSCH transmissions in cells with indexes larger that the index of the cell. A mapping to numeric values of a forward counter DAI that includes 2 bits can be as in Table 4.

TABLE 4

Value of Cell-Domain Forward Counter DAI

| DAI MSB, LSB | $V_{DAI,F}^{DL-C}$ | Number of DL cells with PDSCH transmission and with PDCCH/ EPDCCH indicating DL SPS release |
|---|---|---|
| 0, 0 | 1 | 1 or 5 or 9 or 13 or 17 or 21 or 25 or 29 |
| 0, 1 | 2 | 2 or 6 or 10 or 14 or 18 or 22 or 26 or 30 |
| 1, 0 | 3 | 3 or 7 or 11 or 15 or 19 or 23 or 27 or 31 |
| 1, 1 | 4 | 0 or 4 or 8 or 12 or 16 or 20 or 24 or 28 |

Figure 14:
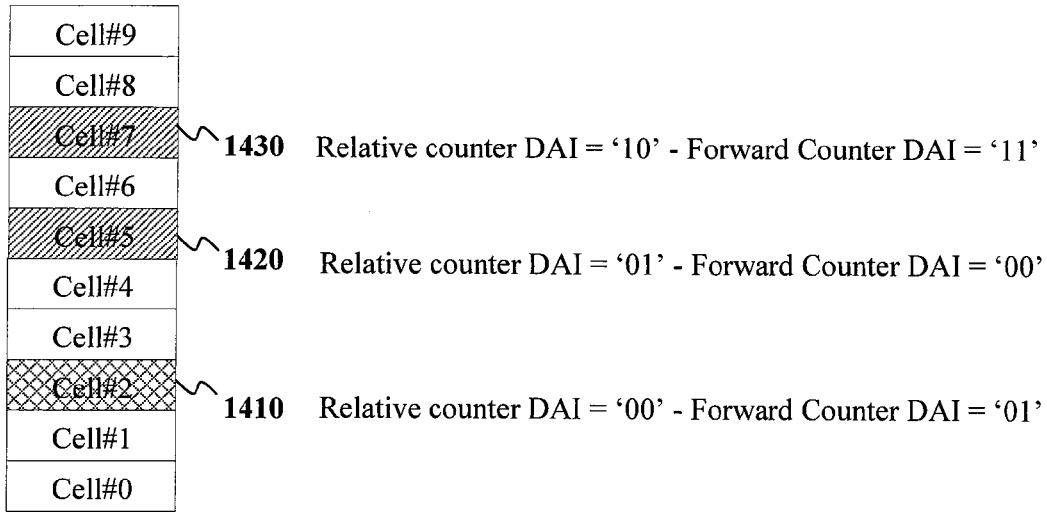
FIG. 14 illustrates a functionality of a cell-domain DAI that includes a relative counter DAI and a forward counter DAI according to this disclosure.

FIG. 14 illustrates a functionality of a cell-domain DAI that includes a relative counter DAI and a forward counter DAI according to this disclosure.

The eNB 102 configures UE 114 for PDSCH transmissions in ten cells of a FDD system. In a SF, eNB 102 transmits to UE 114 three DL DCI formats for Cell#2 1410, Cell#5 1420, and Cell#7 1430. A cell-domain DAI in a first DL DCI format for Cell#2 includes a relative counter DAI with value $V_{DAI}^{DL-C}=1$ (binary value '00') and a forward counter DAI with value $V_{DAI,F}^{DL-C}=2$ (binary value '01'), a cell-domain DAI in a second DL DCI format for Cell#5 includes a relative counter DAI with value $V_{DAI}^{DL-C}=2$ (binary value '01') and a forward counter DAI with value $V_{DAI,F}^{DL-C}=1$ (binary value '00'), and a cell-domain DAI in a third DL DCI format for Cell#7 includes a relative counter DAI with value $V_{DAI}^{DL-C}=3$ (binary value '10') and a forward counter DAI with value $V_{DAI,F}^{DL-C}=0$ (binary value '11'). UE 114 fails to detect the DL DCI format for Cell#5 and the DL DCI format for Cell#7. Based on the value of the relative counter DAI and the value of the forward counter DAI in the DL DCI format for Cell#2, UE 114 can determine that UE 114 failed to detect two DL DCI formats in cells with indexes larger than the index of Cell#2 and UE 114 places NACK/DTX values for respective HARQ-ACK information bits after the HARQ-ACK information bit for Cell#2.

A value $V_{DAI,T}^{DL-C}$ of a total counter DAI field in a DL DCI format can indicate to UE 114 a total number of DL DCI formats scheduling PDSCH transmissions in respective cells in a SF. For a total counter DAI field of 2 bits, a mapping to numeric values $V_{DAI,T}^{DL-C}$ can be as in Table 3 with $V_{DAI,T}^{DL-C}$ replacing $V_{DAI}^{DL-C}$. Based on a value $V_{DAI,T}^{DL-C}$ for the total counter DAI and on a value $V_{DAI}^{DL-C}$ for the relative counter DAI in a DL DCI format scheduling a PDSCH transmission to UE 114 in a cell, UE 114 can determine a number of DL DCI formats that UE 114 failed to detect as well as indexes of cells for the number of DL DCI formats relative to the index of the cell.

Figure 15:
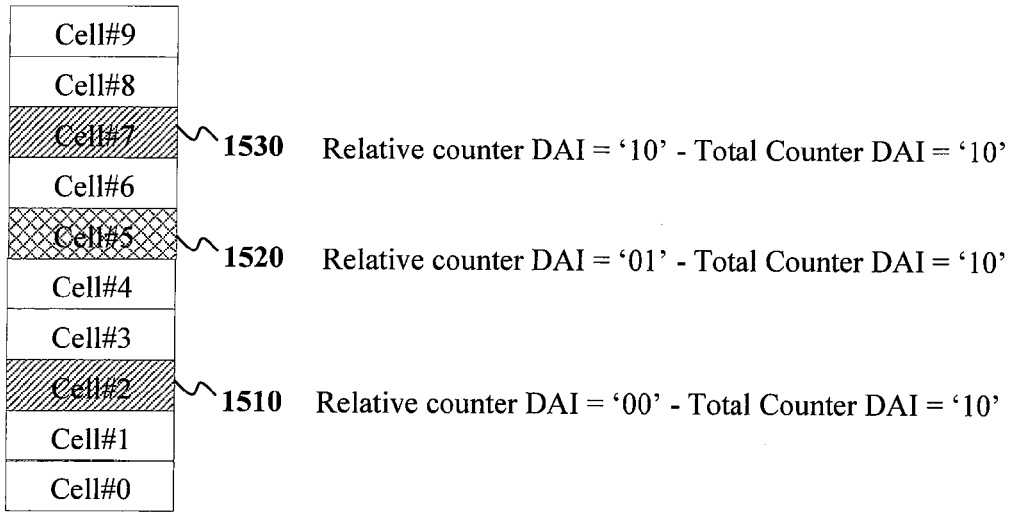
FIG. 15 illustrates a functionality of a cell-domain DAT that includes a relative counter DAI and a total counter DAI according to this disclosure.

FIG. 15 illustrates a functionality of a cell-domain DAI that includes a relative counter DAI and a total counter DAI according to this disclosure.

UE 114 is configured by eNB 102 for PDSCH transmissions in ten cells of a FDD system. In a SF, eNB 102 transmits to UE 114 three DL DCI formats for Cell#2 1510, Cell#5 1520, and Cell#7 1530. A cell-domain DAI in a first DL DCI format for Cell#2 includes a relative counter DAI with value $V_{DAI}^{DL-C}=1$ (binary value '00') and a total counter DAI with value $V_{DAI,T}^{DL-C}=3$ (binary value '10'), a cell-domain DAI in a second DL DCI format for Cell#5 includes a relative counter DAI with value $V_{DAI}^{DL-C}=2$ (binary value '01') and a total counter DAI with value $V_{DAI,T}^{DL-C}=3$ (binary value '10'), and a cell-domain DAI in a third DL DCI format for Cell#7 includes a relative counter DAI with value $V_{DAI}^{DL-C}=3$ (binary value '10'), and a total counter DAI with value $V_{DAI,T}^{DL-C}=3$ (binary value '10'). UE 114 fails to detect the DL DCI format for Cell#2 and the DL DCI format for Cell#7. Based on the value $V_{DAI}^{DL-C}=2$ of the relative counter DAI and the value $V_{DAI,T}^{DL-C}=3$ of the total counter DAI in the DL DCI format for Cell#5, UE 114 can determine that UE 114 failed to detect two DL DCI formats, where a first DL DCI format is for a first cell with index smaller than the index of Cell#5 and a second DL DCI format is for a second cell with index larger than the index of Cell#5, and UE 114 places NACK/DTX values for the respective HARQ-ACK information bits.

In addition to UE 114 determining a number of cells that UE 114 fails to detect respective DL DCI formats scheduling respective PDSCH transmissions and an order of a number of cells according to respective configured indexes, UE 114 needs to determine whether UE 114 needs to convey one or two HARQ-ACK information bits (both with NACK/DTX value) for each cell from the number of cells according to a PDSCH TM in the cell. When UE 114 applies HARQ-ACK spatial domain bundling, UE 114 provides HARQ-ACK feedback only for a number of cells that UE 114 determines as having respective PDSCH transmissions (or SPS PDSCH release) in a SF. This avoids a dependence of HARQ-ACK information that UE 114 generates on a respective PDSCH TM and results to UE 114 generating one HARQ-ACK information bit for each cell that UE 114 identifies as UE 114 having a scheduled PDSCH transmission in a SF. When UE 114 does not apply HARQ-ACK spatial domain bundling and UE 114 is configured for at least one cell a PDSCH TM that supports more than one data TB, UE 114 reports two HARQ-ACK information bits for all cells to avoid a dependence of HARQ-ACK information that UE 114 generates on a respective PDSCH TM.

An order of HARQ-ACK information bits in a codeword for transmission using a PUCCH format can be according to an order of indexes of cells that UE 114 identifies as having a scheduled PDSCH transmission in a respective SF. UE 114 can place a HARQ-ACK information bit in response to a SPS PDSCH transmission either according to a respective cell index or at a predetermined location in a HARQ-ACK codeword, such as a first one or a last one.

Figure 16:
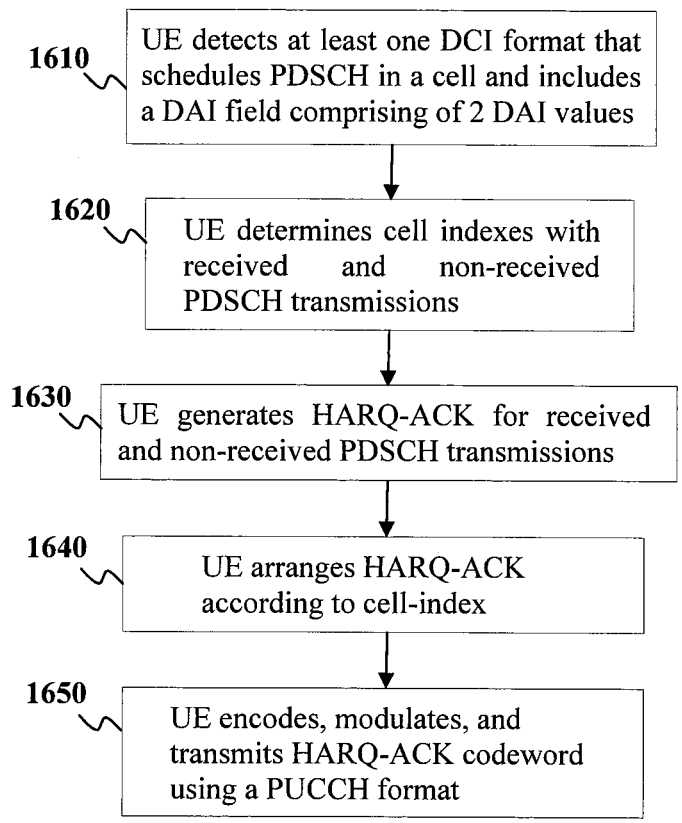
FIG. 16 illustrates a generation of HARQ-ACK information bits by a UE based on a counter DAI field and either on a forward DAI field or on a total DAI field according to this disclosure.

FIG. 16 illustrates a generation of HARQ-ACK information bits by a UE based on a counter DAI field and either on a forward DAI field or on a total DAI field according to this disclosure.

UE 114 is configured for CA operation and detects one or more DL DCI formats that schedule respective one or more PDSCH transmissions in one or more respective cells in a SF. A DL DCI format includes a cell-domain DAI field that comprises of a relative counter DAI and either a forward counter DAI or a total counter DAI 1610. Based on values of the two DAIS fields in the one or more DL DCI formats, UE 114 determines cell indexes with received and non-received PDSCH transmissions 1620 that correspond to detected or non-detected DL DCI formats. UE 114 generates HARQ-ACK information for received and non-received PDSCH transmissions. UE 114 can either apply HARQ-ACK spatial domain bundling in case a PDSCH TM is associated with transmission of two data TBs, or transmit two HARQ-ACK bits per cell when UE 114 is configured with a PDSCH TM associated with transmission of two data TBs in at least one cell, or transmit one HARQ-ACK bit per cell when UE 114 is configured with a PDSCH TM associated with transmission of one data TB in all cells 1630. UE 114 arranges the HARQ-ACK information according to cell indexes of received and non-received PDSCH transmissions 1640. Finally, UE 114 encodes, modulates, and transmits the HARQ-ACK information using a PUCCH format 1650. UE 114 can select the PUCCH format based on a HARQ-ACK payload.

DAI Design for a TDD System

For a TDD system, in addition to a cell dimension, HARQ-ACK codeword determination needs to account for a time dimension corresponding to SFs in a bundling window. This is achieved by including in a DL DCI format both a cell-domain DAI that UE 114 can use to derive a number of DL DCI formats that eNB 102 transmits to UE 114 in a respective SF of a bundling window and a time-domain DAI that UE 114 can use to determine whether or not UE 114 failed to detect some or all DL DCI formats that eNB 102 transmitted to UE 114 in a previous SF of the bundling window or by including a 2-dimensional DAI spanning both the cell-domain and the time-domain (cell/time-domain DAI).

When a DL DCI format transmission is in a same SF as an associated PDSCH transmission (or SPS PDSCH release), there is no difference between a DAI counting DCI format transmissions or PDSCH transmissions. When a DL DCI format transmission is in a first SF and an associated PDSCH transmission (or SPS PDSCH release) is in a second SF and the second SF can occur after the first SF, a DAI value needs to count PDSCH transmissions at least when the first SF and the second SF are not associated by a predetermined and fixed time difference. For example, a DL DCI format can include a time index of 2 bits that can indicate whether a SF of an associated PDSCH transmission is 0, 1, 2, or 3 SFs after a SF of the DL DCI format transmission. Then, for a same cell, a one-to-one mapping between a SF of DCI format transmission and an associated HARQ-ACK information bit is not ensured while a one-to-one mapping between a SF of PDSCH transmission and an associated HARQ-ACK information bit is ensured.

A cell-domain DAI design and functionality can be a relative counter only in a cell domain as for a FDD system, or a relative counter across cells and SFs (cell/time-domain DAI) as subsequently described. A cell/time-domain DAI can be a relative counter DAI mapping first in the cell domain and then in the time domain. A time-domain DAI design and functionality can provide a total number of DL DCI formats that eNB 102 transmits to UE 114 in a number of SFs of a bundling window as subsequently described.

Unlike a FDD system where UE 114 does not transmit HARQ-ACK information when UE 114 does not detect a DL DCI format in a SF, for a TDD system a result of UE 114 failing to detect a DL DCI format that eNB 102 transmits to UE 114 in a SF of a bundling window after a last SF of the bundling window where UE 114 detects a DL DCI format, is an incorrect determination of a HARQ-ACK payload (assuming that UE 114 determines the HARQ-ACK payload based on a number of DL DCI formats the UE 114 determines that eNB 102 transmitted in SFs of the bundling window). For example, in a last SF of a bundling window with DL DCI format transmissions to UE 114, eNB 102 can transmit only one DL DCI format to UE 114 and when UE 114 fails to detect the one DL DCI format, UE 114 is not able to accurately determine a HARQ-ACK payload over the bundling window. In this example, the problem can be addressed by a receiver implementation of eNB 102 to determine whether or not UE 114 transmits a first HARQ-ACK payload or a second HARQ-ACK payload. The first HARQ-ACK payload can be one corresponding to UE 114 having a correct determination of transmitted DL DCI formats in a bundling window and the second HARQ-ACK payload can be one corresponding to UE 114 failing to determine transmitted DL DCI formats in a last SF within a bundling window where eNB 102 transmits DL DCI formats to UE 114.

In a first approach, when UE 114 transmits a first HARQ-ACK payload using a first PUCCH format or a first PUCCH resource and UE 114 transmits a second HARQ-ACK payload using a second PUCCH format or a second PUCCH resource, eNB 102 can determine the PUCCH format or the PUCCH resource that UE 114 uses to transmit the HARQ-ACK payload by determining a discontinuous transmission (DTX) for the other PUCCH format or the other PUCCH resource. For example, DTX can be determined when a received signal power, such as a RS power, is below a threshold.

In a second approach, for example when UE 114 can use a same PUCCH format and a same PUCCH to transmit different HARQ-ACK payloads, eNB 102 can perform decoding operations according to a first HARQ-ACK payload and according to a second HARQ-ACK payload and select a hypothesis resulting to a larger normalized decoding metric such as a larger likelihood metric for a decided codeword according to the first or the second HARQ-ACK payload.

In a third approach, for example when UE 114 can use a same PUCCH format and a same PUCCH to transmit different HARQ-ACK payloads, UE 114 can include a CRC in an encoding of a HARQ-ACK information codeword and eNB 102 can detect a HARQ-ACK codeword according to a set of different possible HARQ-ACK payloads and determine a HARQ-ACK codeword based on a successful CRC check (CRC checksum is zero).

In a fourth approach, when UE 114 uses a same PUCCH format and a same PUCCH resource to transmit a first HARQ-ACK payload and a second HARQ-ACK payload, UE 114 can be configured to use different attributes of an associated DMRS according to a last SF within a bundling window where UE 114 detects a DL DCI format. For example, UE 114 can use a first CS/OCC for a DMRS transmission when UE 114 detects a last DL DCI format in a first SF of a bundling window, a second CS/OCC for a DMRS transmission when UE 114 detects a last DL DCI format in a second SF of a bundling window, and so on. When a number of SFs in a bundling window $M_W$ is larger than a number of DMRS CS/OCCs $M_{CS/OCC}$, UE 114 can use a first CS/OCC value for SF $M_{CS/OCC}+1$, and so on.

Figure 17:
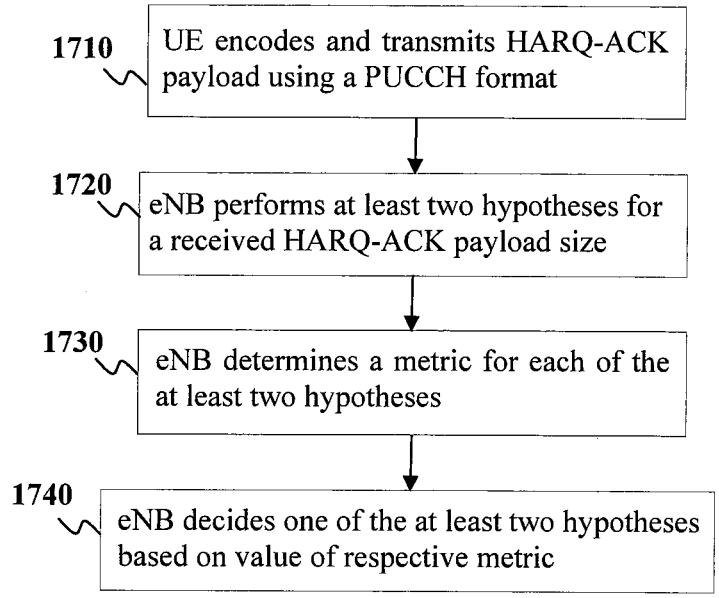
FIG. 17 illustrates a procedure for a UE to transmit and for an eNB to detect an HARQ-ACK information payload according to this disclosure.

FIG. 17 illustrates a procedure for a UE to transmit and for an eNB to detect an HARQ-ACK information payload according to this disclosure.

UE 114 encodes and transmits a HARQ-ACK payload in a PUCCH using a PUCCH format in a PUCCH resource 1710. The eNB 102 considers at least two hypotheses for a received HARQ-ACK payload size 1720. Each of at least two hypotheses can be associated with a different PUCCH format, or with different resources, or with a same PUCCH format and a same resource. The eNB 102 determines a metric for each of the at least two hypotheses 1730. For example, a metric can be a received power for each of the different PUCCH formats or resources, or a likelihood metric for a decoded HARQ-ACK codeword for each of the at least two hypotheses, or a CRC check result for a decoded HARQ-ACK codeword for each of the at least two hypotheses, or a DMRS received power for each of the at least two hypotheses assuming that each of the at least two hypotheses corresponds to a different CS/OCC for the DMRS. The eNB 102 decides on one of the at least two hypotheses based at least on a value of the respective metrics 1740. The eNB 102 can further condition a decision depending on a probability for a respective metric. For example eNB 102 can assign a larger weight to a metric corresponding to UE 114 detecting at least one DL DCI format from one or more DL DCI formats that eNB 102 transmits to UE 114 in a last SF within a bundling window.

An alternative to using a cell-specific functionality for a time-domain DAI is to change the functionality of the time-domain DAI to cell-common (time-domain total counter DAT). When UE 114 detects a DL DCI format scheduling a PDSCH transmission on a cell in a SF within a bundling window, a cell-domain DAI value $V_{DAI}^{DL-C}$ can provide a total number of DL DCI formats transmitted to UE 114 in the SF of the bundling window while a time-domain DAI value $V_{DAI,T}^{DL-T}$ can provide a count of DL DCI formats transmitted in previous SFs of the bundling window, when any, and in the SF. In this manner, UE 114 can use a value $V_{DAI,T}^{DL-T}$ of a time-domain total counter DAI field in a DL DCI format to determine a number of DL DCI formats that UE 114 failed to detect in respective SFs of a bundling window that occur prior to or at the SF where UE 114 detects the DL DCI format that includes the time-domain total counter DAI field with value $V_{DAI,T}^{DL-T}$.

A time-domain total counter DAI value $V_{DAI,T}^{DL-T}$ acts as a counter for all DL DCI formats transmitted to UE 114 in all SFs (across all cells) up to a SF where eNB 102 transmits the DL DCI format that includes the time-domain total counter DAI value $V_{DAI,T}^{DL-T}$. As a consequence, unlike a FDD system, a cell-domain DAI for a TDD system need only include a relative counter $V_{DAI}^{DL-C}$ of a DL DCI format for a cell according to a cell index. A cell-common functionality of a time-domain total counter DAI value $V_{DAI,T}^{DL-T}$ does not preclude UE 114 from incorrectly determining a HARQ-ACK payload for transmission in a PUCCH when UE 114 fails to detect any DL DCI format that eNB 102 transmits to UE 114 in a last SF within a bundling window (and therefore means such as ones described with respect to FIG. 17 can be additionally needed by eNB 102 to correctly detect a HARQ-ACK codeword transmitted by UE 114). However, a cell-common functionality of a time-domain total counter DAI can result to a correct HARQ-ACK payload determination and arrangement of HARQ-ACK information bits in a codeword (HARQ-ACK codebook determination) for HARQ-ACK transmission in a PUSCH where a DAI field in a DL DCI format scheduling a PUSCH transmission (UL DAI) can serve as time-domain total counter DAI for a last SF in a bundling window where eNB 102 transmits to UE 114 DL DCI formats scheduling PDSCH transmissions.

FIG. 18 illustrates a combined functionality of a relative counter DAI and of a total counter DAI according to this disclosure.

The eNB 102 configures UE 114 ten DL cells for PDSCH transmissions in a TDD system where a bundling window size includes four SFs. In a first SF, SF#0 1810, eNB 102 transmits to UE 114 three DL DCI formats scheduling PDSCH transmissions in Cell#2, Cell#5, and Cell#7, respectively. A cell-domain counter DAI in a DL DCI format for Cell#2 has a value $V_{DAI}^{DL-C}$ of '00' for a counter of the DL DCI format, a cell-domain counter DAI in a DL DCI format for Cell#5 has a value $V_{DAI}^{DL-C}$ of '01' for a counter of the DL DCI format, and a cell-domain counter DAI in a DL DCI format for Cell#7 has a value $V_{DAI}^{DL-C}$ of '10' for a counter of the DL DCI format. In SF#0, a time-domain total counter DAI in each of the three DL DCI formats has a value $V_{DAI,T}^{DL-T}$ of '10' (corresponds to a numeric value of 3).

In a second SF, SF#1 1820, eNB 102 transmits to UE 114 three DL DCI formats scheduling PDSCH transmissions in Cell#3, Cell#6, and Cell#7. A cell-domain counter DAI in a DL DCI format for Cell#3 has a value $V_{DAI}^{DL-C}$ of '00' for a counter of the DL DCI format, a cell-domain counter DAI in a DL DCI format for Cell#6 has a value $V_{DAI}^{DL-C}$ of '01' for a counter of the DL DCI format, and a cell-domain counter DAI in a DL DCI format for Cell#7 has a value $V_{DAI}^{DL-C}$ of '10' for a counter of the DL DCI format. In SF#1, a time-domain total counter DAI in each of the three DL DCI formats has a value $V_{DAI,T}^{DL-T}$ of '01' (equivalent to a numeric value of 6).

In a third SF, SF#2 1830, eNB 102 transmits to UE 114 two DL DCI formats scheduling PDSCH transmissions in Cell#5 and Cell#7 and UE 114 fails to detect both DL DCI formats. A cell-domain counter DAI in a DL DCI format for Cell#5 has a value $V_{DAI}^{DL-C}$ of '00' for a counter of the DL DCI format and a cell-domain counter DAI in a DL DCI format for Cell#7 has a value $V_{DAI}^{DL-C}$ of '01' for a counter of the DCI format. In SF#2, a time-domain total counter DAI in each of the two DL DCI formats has a value $V_{DAI,T}^{DL-T}$ of '11' (corresponds to a numeric value of 8).

In a fourth SF, SF#3 1840, eNB 102 transmits to UE 114 three DL DCI formats scheduling PDSCH transmissions in Cell#3, Cell#6, and Cell#7. A cell-domain counter DAI in a DL DCI format for Cell#3 has a value $V_{DAI}^{DL-C}$ of '00' for a counter of the DL DCI format, a cell-domain counter DAI in a DL DCI format for Cell#6 has a value $V_{DAI}^{DL-C}$ of '01' for a counter of the DL DCI format, and a cell-domain counter DAI in a DL DCI format for Cell#7 has a value $V_{DAI}^{DL-C}$ '10' for a counter of the DL DCI format. In SF#3, a time-domain total counter DAI in each of the three DL DCI formats has a value $V_{DAI,T}^{DL-T}$ of '10' (corresponds to a numeric value of 11). UE 114 knows that the time-domain total counter DAI value $V_{DAI}^{DL-CT}$ is a numeric 6 in SF#1 and a numeric 11 in SF#3, determines 3 DL DCI formats in SF#3, and therefore UE 114 knows that UE 114 failed to detect 2 DL DCI formats in SF#2.

Instead of a time-domain total DAI being a cell-common total counter DAI, a cell/time-domain relative counter DAI can be used. A cell/time-domain relative counter DAI field can be same as an existing DAI field in a DL DCI format for a TDD system but with a different interpretation. For example, for CA operation with up to five DL cells in a TDD system, DL DCI formats include a DAI field of 2 bits that is cell-specific and functions as a relative counter of DL DCI formats in SFs of a bundling window for a cell (see also REF 2 and REF 3). For CA operation with more than 5 DL cells in a TDD system, a DAI field in a DL DCI format scheduling a PDSCH transmission in a SF on a cell provides a counter $V_{DAI}^{DL-CT}$ of DL DCI formats, up to the SF and the cell, first across cells starting from a cell with a smallest index (Cell#0) and then across SFs in a bundling window starting from a SF with a smallest index (SF#0). A configuration for a use of a DAI field in a DL DCI format can be implicit, such as for example when UE 114 is configured with a number of cells that is larger than a predetermined number, such as 5, or explicit such as by 1-bit indicating either a cell-specific use of a counter DAI field across SFs of a bundling window (as in REF 2 and REF 3) or a 2-dimensional use of the counter DAI field first across cells and then across SFs up to a SF and a cell corresponding to the DL DCI format. For a number of C configured cells and a bundling window size of $M_W$ SFs, a joint cell/time-domain relative counter DAI field can include 2 bits and a mapping of $V_{DAI}^{DL-CT}$ can be as a mapping of $V_{DAI}^{UL-CT}$ in Table 5 (same mapping applies for values $V_{DAI,T}^{DL-T}$ of a time-domain total counter DAI field of 2 bits).

TABLE 5

Cell/Time-Domain Relative Counter DAI Values in a DL DCI Format

| DAI MSB, LSB | $V_{DAI}^{DL-CT}$ | Number of DL cells with PDSCH transmissions and with PDCCH/EPDCCH indicating DL SPS release. |
| --- | --- | --- |
| 0, 0 | 1 | 1 or 5 or 9 or 13 or 17 or 21 or 25 or 29 . . . or $M_W \cdot C - 3$ |
| 0, 1 | 2 | 2 or 6 or 10 or 14 or 18 or 22 or 26 or 30 . . . or $M_W \cdot C - 2$ |
| 1, 0 | 3 | 3 or 7 or 11 or 15 or 19 or 23 or 27 or 31 . . . or $M_W \cdot C - 1$ |
| 1, 1 | 4 | 0 or 4 or 8 or 12 or 16 or 20 or 24 or 28 or 32 . . . or $M_W \cdot C$ |

For brevity, in the following, a cell/time-domain relative counter DAI is referred to as counter DAI and a time-domain total DAI is referred to as total DAI.

FIG. 19 illustrates a determination and arrangement for a HARQ-ACK information payload using a counter DAI for a TDD system according to this disclosure.

UE 114 is configured by eNB 102 for PDSCH transmissions in ten cells of a TDD system where a bundling window size includes four SFs. In a first SF, SF#0 1910, eNB 102 transmits to UE 114 three DL DCI formats scheduling respective PDSCH transmissions in Cell#2, Cell#5, and Cell#7. A counter DAI in a respective DL DCI format has a value $V_{DAI}^{DL-CT}=1$ for Cell#2, a value $V_{DAI}^{DL-CT}=2$ for Cell#5, and a value $V_{DAI}^{DL-CT}=3$ for Cell#7. In a second SF, SF#1 1920, eNB 102 transmits to UE 114 three DL DCI formats scheduling respective PDSCH transmissions in Cell#3, Cell#6, and Cell#7. A counter DAI in a respective DL DCI format has a value $V_{DAI}^{DL-CT}=4$ for Cell#3, a value $V_{DAI}^{DL-CT}=5$ for Cell#6, and a value $V_{DAI}^{DL-CT}=6$ for Cell#7. In a third SF, SF#2 1930, eNB 102 transmits to UE 114 two DL DCI formats scheduling respective PDSCH transmissions in Cell#5 and Cell#7. A counter DAI in a respective DL DCI format has a value $V_{DAI}^{DL-CT}=7$ for Cell#5 and a value $V_{DAI}^{DL-CT}=8$ for Cell#7. In a fourth SF, SF#3 1940, eNB 102 transmits to UE 114 two DL DCI formats scheduling respective PDSCH transmissions in Cell#3 and Cell#7. A counter DAI in a respective DL DCI format has a value $V_{DAI}^{DL-CT}=9$ for Cell#3 and a value $V_{DAI}^{DL-CT}=10$ for Cell#7.

In SF#0 1910, UE 114 detects the first and third DL DCI formats and fails to detect the second DL DCI format. From the values $V_{DAI}^{DL-CT}=1$ and $V_{DAI}^{DL-CT}=3$ of the counter DAI in the two detected DL DCI formats in SF#0, UE 114 determines that UE 114 failed to detect a DL DCI format for a cell with index larger than 2 and smaller than 7. Therefore, UE 114 can determine and arrange the HARQ-ACK information bits as {x, NACK/DTX, x}, where 'x' represents either an ACK or a NACK/DTX, in response to receptions or absence of receptions of PDSCH transmissions scheduled by DL DCI formats transmitted in SF#0. In SF#1 1920, UE 114 detects the first and second DL DCI formats and fails to detect the third DL DCI format. From the values $V_{DAI}^{DL-CT}=4$ and $V_{DAI}^{DL-CT}=5$ of the counter DAI in the two detected DL DCI formats in SF#1, UE 114 determines that UE 114 did not fail to detect any other DL DCI format in SF#0. For SF#0 and SF#1, the UE can generate HARQ-ACK information bits as {x, NACK/DTX, x, x, x}. In SF#2 1930, UE 114 detects both the first and second DL DCI formats. From the value $V_{DAI}^{DL-CT}=7$ of the counter DAI in the detected DL DCI format for Cell#5 in SF#2, UE 114 determines that UE 114 failed to detect a DL DCI format in SF#1 for a cell with larger index than Cell#6. From the value $V_{DAI}^{DL-CT}=8$ of the counter DAI in the detected DL DCI format for Cell#7 in SF#2, UE 114 determines that UE 114 did not fail to detect a DL DCI format in SF#2 for a cell with smaller index than Cell#7. For SF#0, SF#1, and SF#2, UE 114 can generate HARQ-ACK information bits as {x, NACK/DTX, x, x, x, NACK/DTX, x, x}. In SF#3 1940, UE 114 fails to detect both the first and second DL DCI formats and UE 114 cannot determine this error event.

The functionalities of a counter DAI (as described in FIG. 19) and of a total counter DAI (as described in FIG. 18) can be combined. A DL DCI format transmitted in a SF for PDSCH transmission in a cell can include a counter DAI providing a counter of DL DCI formats across cells and SFs up to the SF and the cell, and a total counter DAI providing a total number of DL DCI formats across cells and SFs up to the SF. Relative to the operation in FIG. 18, a (cell/time-domain) counter DAI replaces a cell-domain relative counter DAI. A resulting functionality is practically equivalent.

FIG. 20 illustrates a determination and arrangement for a HARQ-ACK information payload using a value of a counter DAI and a value of a total DAI for a TDD system according to this disclosure.

The eNB 102 configures UE 114 for PDSCH transmissions in ten cells of a TDD system where a bundling window size includes four SFs. In a first SF, SF#0 2010, eNB 102 transmits to UE 114 three DL DCI formats scheduling respective PDSCH transmissions in Cell#2, Cell#5, and Cell#7. A counter DAI in a respective DL DCI format has a value $V_{DAI}^{DL-CT}=1$ for Cell#2, a value $V_{DAI}^{DL-CT}=2$ for Cell#5, and a value $V_{DAI}^{DL-CT}=3$ for Cell#7 and a total counter DAI in each of the three DL DCI formats has a value $V_{DAI,T}^{DL-T}=3$. In a second SF, SF#1 2020, eNB 102 transmits to UE 114 three DL DCI formats scheduling respective PDSCH transmissions in Cell#3, Cell#6, and Cell#7. A counter DAI in a respective DL DCI format has a value $V_{DAI}^{DL-CT}=4$ for Cell#3, a value $V_{DAI}^{DL-CT}=5$ for Cell#6, and a value $V_{DAI}^{DL-CT}=6$ for Cell#7 and a total counter DAI in each of the three DL DCI formats has a value $V_{DAI,T}^{DL-T}=6$. In a third SF, SF#2 2030, eNB 102 transmits to UE 114 two DL DCI formats scheduling respective PDSCH transmissions in Cell#5, and Cell#7. A counter DAI in a respective DL DCI format has a value $V_{DAI}^{DL-CT}=7$ for Cell#5 and a value $V_{DAI}^{DL-CT}=8$ for Cell#7 and a total counter DAI in each of the two DL DCI formats has a value $V_{DAI,T}^{DL-T}=8$. In a fourth SF, SF#3 2040, eNB 102 transmits to UE 114 two DL DCI formats scheduling respective PDSCH transmissions in Cell#3 and Cell#7. A counter DAI in a respective DL DCI format has a value $V_{DAI}^{DL-CT}=9$ for Cell#3 and a value $V_{DAI}^{DL-CT}=10$ for Cell#7 and a total counter DAI in each of the two DL DCI formats has a value $V_{DAI,T}^{DL-CT}=10$. For SF#0, SF#1, and SF#2, a determination and arrangement of HARQ-ACK information using a value of a counter DAI can be as in FIG. 19. A usefulness of the total counter DAI $V_{DAI,T}^{DL-T}$ appears in SF#3 where UE 114 detects a DL DCI format scheduling a PDSCH in Cell#3 but fails to detect a DL DCI format scheduling a PDSCH in Cell#7. Without the inclusion of the total counter DAI $V_{DAI,T}^{DL-T}$ in DL DCI formats, UE 114 is unable to determine that UE 114 failed to detect a DL DCI format scheduling a PDSCH in a cell with index larger than the index of Cell#3. With the inclusion of the total counter DAI $V_{DAI,T}^{DL-T}$ in DL DCI formats, based on the $V_{DAI,T}^{DL-T}$ value in the DL DCI format scheduling PDSCH in Cell#3 (in SF#3) that UE 114 detects, UE 114 can determine that UE 114 failed to detect a DL DCI format scheduling a PDSCH in a cell with index larger than the index of Cell#3.

DL DCI Format Transmission in a CSS

A DL DCI format, such as DCI format 1A, that eNB 102 transmits in a CSS of a primary cell and schedules a PDSCH transmission on a primary cell does not include new fields for a (cell/time-domain) counter DAI and for a (time-domain) total counter DAI for a FDD system or for a total counter DAI for a TDD system. This is because a size of DCI format 1A when transmitted in a CSS needs to be same as a size of a DCI format 3/3A that is transmitted in the CSS and needs to be decoded by a group of UEs where at least some UEs in the group of UEs can be unaware of a change in the size of DCI format 1A in case a counter DAI or a total DAI are included in DCI format 1A.

For a FDD system, when UE 114 detects a DCI format 1A that is transmitted in a CSS and schedules a PDSCH on a primary cell, and UE 114 also detects at least one other DL DCI format that is transmitted in a USS and schedules a PDSCH reception on a secondary cell, a value for a counter DAI and a value for a total DAI in the at least one other DL DCI format counts the transmission of DCI format 1A and UE 114 places HARQ-ACK information for DCI format 1A in a first position of an associated HARQ-ACK codeword.

For a TDD system, when UE 114 detects a DCI format 1A in a CSS in a SF of a bundling window that schedules a PDSCH on a primary cell, and UE 114 also detects at least one other DL DCI format in a USS in the SF or in a later SF of the bundling window, a value for a counter DAI and a value for a total DAI in the at least one other DL DCI format includes counting of DCI format 1A. UE 114 places HARQ-ACK information for DCI format 1A in a first position for HARQ-ACK information that UE 114 determines for the SF. The first position for HARQ-ACK information that UE 114 determines for the SF is the first position in an associated HARQ-ACK codeword only when the SF is the first SF in the bundling window.

Figures 21, 22:
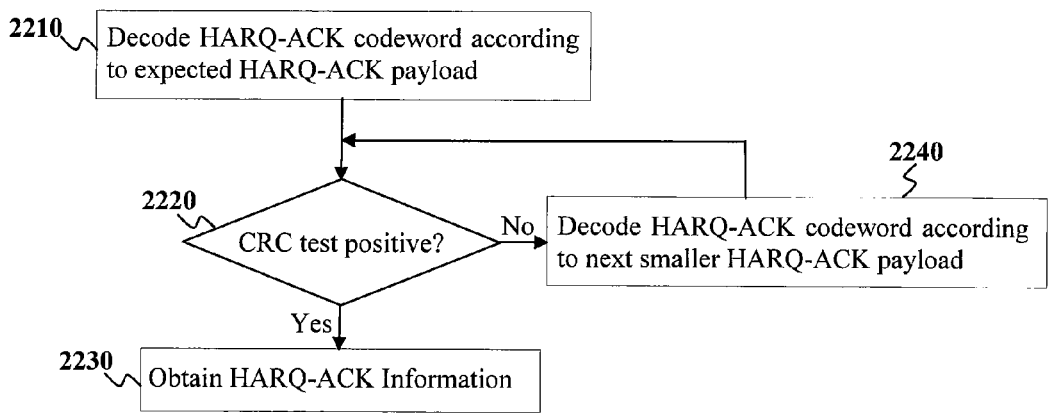
FIG. 21 illustrates a determination and arrangement for a HARQ-ACK information payload when a DL DCI format is transmitted in a CSS for a TDD system according to this disclosure.
FIG. 22 illustrates a procedure for an eNB to detect an HARQ-ACK codeword in a PUCCH using a CRC check or, in case of multiple possible PUCCH formats, a DTX detection for some of the PUCCH formats according to this disclosure.

FIG. 21 illustrates a determination and arrangement for a HARQ-ACK information payload when a DL DCI format is transmitted in a CSS for a TDD system according to this disclosure.

The eNB 102 configures UE 114 for PDSCH transmissions in ten cells of a TDD system where a bundling window size includes four SFs. In a first SF, SF#0 2010, eNB 102 transmits to UE 114 three DL DCI formats scheduling respective PDSCH transmissions in Cell#2, Cell#5, and Cell#7. A counter DAI in a respective DL DCI format has a value $V_{DAI}^{DL-CT}=1$ for Cell#2, a value $V_{DAI}^{DL-CT}=2$ for Cell#5, and a value $V_{DAI}^{DL-CT}=3$ for Cell#7 and a total DAI in each of the three DL DCI formats has a value $V_{DAI,T}^{DL-T}=3$. In a second SF, SF#1 2020, eNB 102 transmits to UE 114 three DL DCI formats scheduling respective PDSCH transmissions in Cell#0, Cell#6, and Cell#7 and the DL DCI format that schedules PDSCH transmission in Cell#0 is transmitted in a CSS and does not include a total DAI. A counter DAI in a respective DL DCI format has a value $V_{DAI}^{DL-CT}=4$ for Cell#0, a value $V_{DAI}^{DL-CT}=5$ for Cell#6, and a value $V_{DAI}^{DL-CT}=6$ for Cell#7 and a total DAI in the second and third DL DCI formats of the three DL DCI formats has a value $V_{DAI,T}^{DL-T}=6$. In a third SF, SF#2 2030, eNB 102 transmits to UE 114 two DL DCI formats scheduling respective PDSCH transmissions in Cell#5, and Cell#7. A counter DAI in a respective DL DCI format has a value $V_{DAI}^{DL-CT}=7$ for Cell#5 and a value $V_{DAI}^{DL-CT}=8$ for Cell#7 and a total DAI in each of the two DL DCI formats has a value $V_{DAI,T}^{DL-T}=8$. In a fourth SF, SF#3 2040, eNB 102 transmits to UE 114 two DL DCI formats scheduling respective PDSCH transmissions in Cell#0 and Cell#7 and the DL DCI format that schedules PDSCH transmission in Cell#0 is transmitted in a CSS and does not include a total DAI. A counter DAI in a respective DL DCI format has a value $V_{DAI}^{DL-CT}=9$ for Cell#0 and a value $V_{DAI}^{DL-CT}=10$ for Cell#7 and a counter DAI in the second of the two DL DCI formats has a value $V_{DAI}^{DL-T}=10$. HARQ-ACK information for the DL DCI format transmitted in the CSS in SF#1 2120 is placed fourth in a HARQ-ACK codeword as a respective counter DAI value is $V_{DAI}^{DL-CT}=4$ and a total DAI value in SF#0 is $V_{DAI,T}^{DL-T}=3$. HARQ-ACK information for the DL DCI format transmitted in the CSS in SF#3 2140 is placed ninth in the HARQ-ACK codeword as a respective counter DAI value is $V_{DAI}^{DL-CT}=9$ and a total DAI value in SF#2 is $V_{DAI,T}^{DL-T}=8$.

Resolution of Error Cases

It is also possible that UE 114 fails to detect any transmitted DL DCI format in SFs after a last SF where UE 114 detects a DL DCI format, for example as in FIG. 19. Then, regardless of DAI types in a DL DCI format, UE 114 cannot determine a correct HARQ-ACK information payload. The eNB 102 can resolve this ambiguity using one of the four previously described approaches. For example, according to the third approach and for a TDD system and for the exemplary case in FIG. 19 or FIG. 20 or FIG. 21, eNB 102 can attempt detection and perform a CRC check (determine whether or not a CRC checksum is zero) for each of the four following HARQ-ACK information payload values corresponding to the following (a) UE 114 detects at least one DL DCI format in SF#0 and does not detect any DL DCI format in SF#1 and SF#2 and SF#3 (UE 114 determines a first HARQ-ACK information payload, can be considered as the least likely scenario)

(b) UE 114 detects at least one DL DCI format in SF#1 and does not detect any DL DCI format in SF#2 and SF#3 (UE 114 determines a second HARQ-ACK information payload, can be considered as the second least likely scenario)

(c) UE 114 detects at least one DL DCI format in SF#2 and does not detect any DL DCI format in SF#3 (UE 114 determines a third HARQ-ACK information payload, can be considered as the second most likely scenario)

(d) UE detects at least one DL DCI format in SF#3 (UE 114 determines a fourth HARQ-ACK information payload, can be considered as the most likely scenario)

When UE 114 transmits HARQ-ACK information using a PUCCH format that depends on a HARQ-ACK information payload, for example as described in FIG. 13, eNB 102 can attempt detection of multiple PUCCH formats. For example, when UE 114 determines a first HARQ-ACK information payload, UE 114 can use a PUCCH Format 3 while when UE 114 determines a second HARQ-ACK information payload, UE 114 can use a PUCCH Format 4 having a PUSCH-based structure. The eNB 102 can determine whether UE 114 transmits a PUCCH Format 3 by detecting a received energy in a resource that UE 114 can use to transmit the PUCCH Format 3 (DTX detection). The eNB 102 can determine whether UE 114 transmits a PUCCH Format 4 by detecting a received energy in a resource that UE 114 can use to transmit the PUCCH Format 4 or by relying on a check of a CRC that is included with the HARQ-ACK information payload in an encoded codeword when UE 114 uses PUCCH Format 4.

FIG. 22 illustrates a procedure for eNB 102 to detect an HARQ-ACK codeword in a PUCCH using a CRC check or, in case of multiple possible PUCCH formats, a DTX detection for some of the PUCCH formats according to this disclosure.

The eNB 102 first decodes a HARQ-ACK codeword according to a HARQ-ACK information payload, a PUCCH format, and a PUCCH resource that eNB 102 expects UE 114 to use in response to transmissions of DL DCI formats from eNB 102 to UE 114 in one or more SFs 2210. When a check for a CRC, when included in an encoded HARQ-ACK codeword, is positive (CRC checksum is zero) 2220, eNB 102 considers a HARQ-ACK information obtained from a decoded HARQ-ACK codeword as valid 2230. It is also possible that an encoded HARQ-ACK codeword does not include a CRC, such as when UE 114 uses a PUCCH format 3, and in such case eNB 102 can determine whether UE 114 transmits a respective PUCCH based on energy detection at a respective PUCCH resource (absence of DTX detection). When the CRC check is not positive (CRC checksum is not zero) or when eNB 102 detects DTX, eNB 102 proceeds to decode a HARQ-ACK codeword according to a next smaller HARQ-ACK information payload, relative to an expected HARQ-ACK information payload based on the transmitted DL DCI formats, and a respective PUCCH format and a PUCCH resource 2240 and repeats step 2220. For example, for transmissions of DL DCI formats as in FIG. 19 or FIG. 20, an expected HARQ-ACK payload corresponds to one for DL DCI formats transmitted in four SFs (ten DL DCI formats) while a next smaller HARQ-ACK information payload corresponds to DL DCI formats transmitted in the first three SFs (eight DL DCI formats). When the CRC check is not positive, eNB 102 proceeds to decode a HARQ-ACK codeword first according to a HARQ-ACK information payload that corresponds to DL DCI formats transmitted in the first two SFs (six DL DCI formats) and then, when the CRC check is also not positive, according to a HARQ-ACK information payload that corresponds to DL DCI formats transmitted in the first SF (three DL DCI formats). The above steps for the eNB 102 decoding attempts can also be performed in parallel or with a different order.

Determination of Payload and Arrangement of Information Bits in a Codeword for HARQ-ACK Transmission in a PUSCH For a FDD system, when a cell-domain DAI in a DL DCI format scheduling a PDSCH transmission to UE 114 in a cell includes both a counter of transmitted DL DCI formats (or PDSCH transmissions) and either a forward counter of DL DCI format or a total number of DL DCI formats (or PDSCH transmissions), UE 114 can determine a number of DL DCI formats that eNB 102 transmits to UE 114 in a SF to schedule PDSCH transmissions (including SPS PDSCH release) in respective cells. UE 114 can also determine an order of respective cell indexes to arrange respective HARQ-ACK information in a codeword according to an ascending order of cell indexes. Then, assuming that either spatial-domain bundling applies or reported HARQ-ACK information for a cell includes two HARQ-ACK information bits regardless of a PDSCH TM when a PDSCH TM for at least one cell supports two data TBs (otherwise, by default, reported HARQ-ACK information for all cells includes 1 HARQ-ACK bit), UE 114 can determine an HARQ-ACK payload to transmit in a PUSCH in a same manner as in a PUCCH and an UL DAI in an UL DCI format scheduling a PUSCH transmission from UE 114 is not needed. An error case happens only when UE 114 fails to detect all DL DCI that eNB 102 transmits to UE 114 in a last SF within a bundling window.

For a TDD system, when a DL DCI format includes both a cell-domain DAI and a time-domain DAI, where for example the cell-domain DAI can be a counter of DL DCI formats (or PDSCH transmissions) in a SF according to an ascending order of a respective cell index and the time-domain DAI can be a total counter of DL DCI formats (or PDSCH transmissions) in past SF and a present SF of a same bundling window, or when a single counter DAI operates in the joint cell/time-domain (cell-first mapping of DAI values), UE 114 can determine a number of DL DCI formats that eNB 102 transmits to UE 114 in a bundling window to schedule PDSCH transmissions in respective cells and SFs. UE 114 can also determine an order of respective cell indexes and SFs to arrange respective HARQ-ACK information in a codeword according to an ascending order of cell indexes per SF and then according to an ascending order of SFs. Then, UE 114 can determine an HARQ-ACK payload to transmit in a PUSCH. An error case occurs when UE 114 fails to detect all transmitted DL DCI formats (or PDSCH transmissions) that eNB 102 transmits to UE 114 in a last SF within bundling window.

To avoid error cases where UE 114 can have a different understanding than eNB 102 of a number or an order of DL DCI formats transmitted from eNB 102 to UE 114, a DAI field can be included in an UL DCI format scheduling a PUSCH transmission from UE 114. The DAI field can indicate a total number of transmitted DL DCI formats that schedule PDSCH transmissions to UE 114 (or can indicate a total number of PDSCH transmissions), either in a SF for a FDD system or in a bundling window for a TDD system. Otherwise, when error cases are practically immaterial, a DAI field does not need to be included or used in an UL DCI format scheduling a PUSCH transmission and UE 114 determines a HARQ-ACK codeword in a same manner as for transmission in a PUCCH.

For a FDD system, when UE 114 adjusts a PUSCH transmission based on a detected UL DCI format, UE 114 can obtain a DAI value, $V_{DAI}^{UL-C}$. UE 114 can use $V_{DAI}^{UL-C}$ to determine an HARQ-ACK information payload, $O_{HARQ-ACK}$, to multiplex in the PUSCH.

When UE 114 is configured with a maximum of C cells, a cell-domain total counter DAI field, or simply DAI field, in an UL DCI can include, for example, 2 bits having a mapping to respective numeric values $V_{DAI}^{UL-C}$ as in Table 6. Although each combination of the two bits can map to multiple numeric values, an error occurs only when UE 114 fails to detect three successive (based on a cell index) DL DCI formats and, for typical block error rate (BLER) values of 1 e-2 that UE 114 fails to detect a DCI format, this is an immaterial event.

TABLE 6

Cell-Domain Total DAI Values in an UL DCI Format for a FDD System

| DAI MSB, LSB | $V_{DAI}^{UL-C}$ | Number of DL Cells with PDSCH transmissions and with PDCCH/EPDCCH indicating DL SPS release |
|---|---|---|
| 0, 0 | 1 | 1 or 5 or 9 or 13 or 17 or 21 or 25 or 29 . . . or C − 3 |
| 0, 1 | 2 | 2 or 6 or 10 or 14 or 18 or 22 or 26 or 30 . . . or C − 2 |
| 1, 0 | 3 | 3 or 7 or 11 or 15 or 19 or 23 or 27 or 31 . . . or C − 1 |
| 1, 1 | 4 | 0 or 4 or 8 or 12 or 16 or 20 or 24 or 28 or 32 . . . or C |

It is $O_{HARQ-ACK}=V_{DAI}^{UL-C}$ (for 1 bit HARQ-ACK per DL DCI format; otherwise, it is $O_{HARQ-ACK}=2 \cdot V_{DAI}^{UL-C}$) unless $V_{DAI}^{UL-C}=4$ and $U_{DAI}^{Cell}+N_{SPS}=0$ (UE 114 does not detect a DL DCI format scheduling a PDSCH transmission and does not have a SPS PDSCH transmission in a SF) and then UE 114 does not transmit HARQ-ACK in a PUSCH. A spatially bundled HARQ-ACK information bit with index $o_{HARQ-ACK}$, $0 \le o_{HARQ-ACK}$ is associated with a PDSCH transmission scheduled by a DL DCI format with cell-domain DAI value $o_{HARQ-ACK}+1$ where UE 114 sets a value of the HARQ-ACK information bit with index $o_{HARQ-ACK}$ to a NACK/DTX value when UE 114 does not detect a DL DCI format scheduling a PDSCH transmission and having a counter DAI value of $V_{DAI}^{DL-C}=o_{HARQ-ACK}+1$ (UE 114 determines existence of the DL DCI format from a counter DAI or from a total DAI in a next DL DCI format or from the DAI in the UL DCI format). When $N_{SPS}>0$, a HARQ-ACK information bit associated with a SPS PDSCH transmission is assigned index $O_{HARQ-ACK}-1$ (placed last in a HARQ-ACK codeword).

Figure 23:
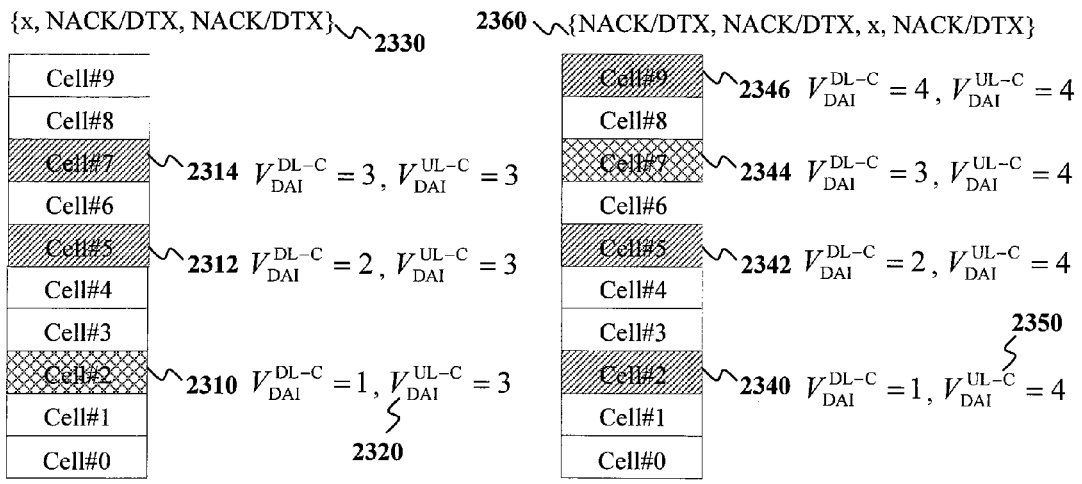
FIG. 23 illustrates a determination and arrangement for a HARQ-ACK information payload transmission in a PUSCH transmission using a counter DAI value in a DL DCI format scheduling a PDSCH transmission and a DAI value in an UL DCI format scheduling a PUSCH transmission for a FDD system according to this disclosure.

FIG. 23 illustrates a determination and arrangement for a HARQ-ACK information payload transmission in a PUSCH transmission using a relative counter DAI value in a DL DCI format scheduling a PDSCH transmission and a total DAI value in an UL DCI format scheduling a PUSCH transmission for a FDD system according to this disclosure.

UE 114 is configured by eNB 102 for PDSCH transmissions in ten cells of a FDD system. In a first case, UE 114 detects a DL DCI format that schedules a PDSCH transmission in Cell#2 and includes a cell-domain counter DAI field having a value $V_{DAI}^{DL-C}=1$ 2310. UE 114 fails to detect DL DCI formats scheduling PDSCH transmissions for Cell#5 2312 and Cell#7 2314. UE 114 also detects an UL DCI format scheduling a PUSCH transmission in a SF where eNB 102 expects UE 114 to transmit HARQ-ACK in response to PDSCH transmissions in Cell#2, Cell#5, and Cell#7 where the UL DCI format includes a cell-domain total DAI field having a value $V_{DAI}^{UL-C}=3$ 2320. Based on the value of $V_{DAI}^{DL-C}=1$ and $V_{DAI}^{UL-C}=3$, UE 114 determines that UE 114 failed to detect 2 DL DCI formats scheduling PDSCH transmissions in cells with index larger than 2 (the index for Cell#2) and UE 114 generates a HARQ-ACK codeword of {x, NACK/DTX, NACK/DTX} 2330 for transmission in the PUSCH where 'x' is either ACK or NACK/DTX depending on a correct or incorrect detection of data TBs conveyed in the PDSCH transmission in Cell#2.

In a second case, UE 114 detects a DL DCI format that schedules a PDSCH transmission in Cell#7 and includes a cell-domain counter DAI field having a value $V_{DAI}^{DL-CT}=3$ 2344. UE 114 fails to detect DL DCI formats scheduling PDSCH transmissions for Cell#2 2340, Cell#5 2342 and Cell#9 2346. UE 114 also detects an UL DCI format scheduling a PUSCH transmission in a SF where eNB 102 expects UE 114 to transmit HARQ-ACK in response to PDSCH transmissions in Cell#2, Cell#5, Cell#7, and Cell#9, where the UL DCI format includes a cell-domain total DAI field having a value $V_{DAI}^{UL-C}=4$ 2350. Based on the values of $V_{DAI}^{DL-C}=3$ and $V_{DAI}^{UL-C}=4$, UE 114 determines that UE 114 failed to detect 2 DL DCI formats scheduling PDSCH transmissions in cells with index smaller than 7 (the index for Cell#7) and 1 DL DCI format scheduling a PDSCH transmission in a cell with index larger than 7 and UE 114 generates a HARQ-ACK codeword of {NACK/DTX, NACK/DTX, x, NACK/DTX} 2360 for transmission in the PUSCH where 'x' is either ACK or NACK/DTX depending on a correct or incorrect detection of data TBs conveyed in the PDSCH transmission in Cell#7. Therefore with a combination of a cell-domain counter DAI field in DL DCI formats scheduling PDSCH transmissions and a cell-domain total counter (that counts all DL DCI formats scheduling PDSCH transmissions in a SF) in an UL DCI format scheduling a PUSCH transmission, UE 114 can identify a HARQ-ACK payload and arrangement of HARQ-ACK information bits in a codeword in a manner that is same as expected by eNB 102.

In case of a SPS PUSCH transmission from UE 114, there is no UL DCI format scheduling the SPS PUSCH transmission and UE 114 cannot obtain a VD value. Relying only on a cell-domain counter DAI field in DL DCI format can result to UE 114 transmitting an incorrect HARQ-ACK payload in the SPS PUSCH as UE 114 can fail to detect DL DCI formats scheduling PDSCH transmissions in cells with larger indexes than a largest index of a cell where UE 114 detects a DL DCI format. A first alternative is for UE 114 to transmit HARQ-ACK information for all configured cells. A second alternative is to rely on eNB 102 to resolve a HARQ-ACK payload ambiguity, for example as described in FIG. 22. A third alternative is to devise means for circumventing a HARQ-ACK payload ambiguity problem.

A first approach for the third alternative is to include a forward relative counter DAI field or a total DAI field, in addition to a cell-domain counter DAI field, in DL DCI formats as was previously described in FIG. 14 or FIG. 15, respectively.

A second approach for the second alternative is for UE 114 to include information for a number of received PDSCH transmissions together with, but separately encoded, the HARQ-ACK information. The second approach can be conditioned on UE 114 multiplexing HARQ-ACK information in a PUSCH transmission that is not scheduled by an UL DCI format. The eNB 102 can first decode an indicator field with value $I_{rx}$ transmitted by UE 114 and indicating a number of PDSCH transmissions (or a number of DL DCI formats) UE 114 received. Based on that information, eNB 102 can determine a HARQ-ACK information payload transmitted by UE 114 and accordingly decode HARQ-ACK information and data information in the PUSCH. For example, an indicator field can include 2 bits where a mapping of the 2 bits can be as in Table 6 by replacing $V_{DAI}^{UL-C}$ with $I_{rx}$ and replacing 'transmissions' with 'receptions'.

Figure 24:
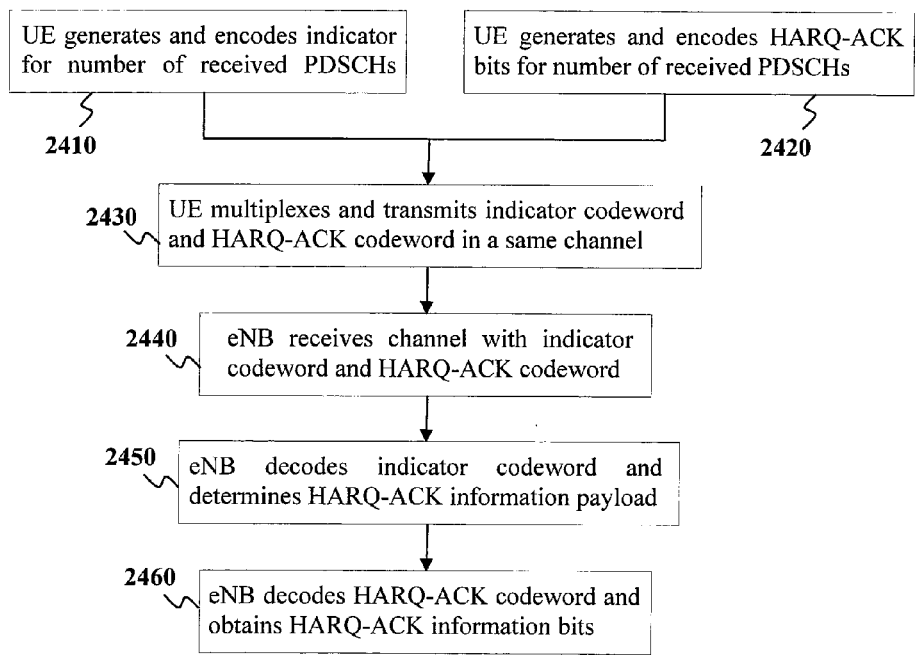
FIG. 24 illustrates a method for a UE to transmit HARQ-ACK information by indicating a number of detected DL DCI formats according to this disclosure.

FIG. 24 illustrates a method for a UE to transmit HARQ-ACK information by indicating a number of detected DL DCI formats according to this disclosure.

UE 114 determines a number of received PDSCHs (or, equivalently by also accounting for SPS PDSCH release, a number of detected DL DCI formats) and generates and encodes an indicator for the number 2410. UE 114 also generates and encodes, separately than the indicator, HARQ-ACK information bits for respective received PDSCH receptions 2420. UE 114 multiplexes and transmits to eNB 102 the indicator codeword and a HARQ-ACK codeword in a same channel (PUSCH or PUCCH) 2430. The eNB 102 receives the channel that conveys the indicator codeword and the HARQ-ACK codeword 2440. The eNB 102 decodes the indicator codeword to obtain a number of PDSCH transmissions that UE 114 received and determine a payload for the HARQ-ACK codeword 2450. Based on the determined payload for the HARQ-ACK codeword, eNB 102 decodes the HARQ-ACK codeword to obtain the HARQ-ACK information bits 2460.

For a TDD system, a DAI field with value $V_{DAI}^{UL-CT}$ in an UL DCI format scheduling a PUSCH transmission can provide a total number of PDSCH transmissions (or DL DCI format transmissions by including SPS PDSCH release) over both a cell domain and a time domain or, equivalently, the DAI field can provide a total number of PDSCH transmissions over all cells and over all SFs of a bundling window (cell/time-domain DAI). A mapping for a value $V_{DAI}^{UL-CT}$ of the DAI field can be as in Table 6 by replacing $V_{DAI}^{UL-C}$ with $V_{DAI}^{UL-CT}$ and considering PDSCH transmissions over the entire bundling window.

A first alternative for determining an arrangement of HARQ-ACK information bits in a codeword is for UE 114 to use a value of a DAI field in an UL DCI format scheduling a PUSCH transmission, a value $V_{DAI}^{DL-C}$ of a cell-domain counter DAI field, and a value $V_{DAI,T}^{DL-T}$ of a time-domain total DAI field in DL DCI formats scheduling PDSCH transmissions in configured cells and SFs of a bundling window. A counter DAI field provides a relative counter of a respective DL DCI format according to an index of a cell with a respective PDSCH transmission. A total DAI field in a DL DCI format provides a total counter for DL DCI formats scheduling PDSCH transmissions in all cells and in all previous SFs and a current SF of a bundling window. Using a value $V_{DAI}^{UL-CT}$ of a DAI in an UL DCI format, UE 114 can determine whether UE 114 failed to detect some DL DCI formats, particularly in SFs of a bundling window after a last SF of the bundling window where UE 114 detects a DL DCI format. Using $V_{DAI}^{DL-C}$, UE 114 can determine whether UE 114 failed to detect one or more DL DCI formats scheduling PDSCHs in cells with smaller indexes than an index of a cell where UE 114 detects a DL DCI format that includes $V_{DAI}^{DL-C}$ and schedules a PDSCH transmission in the cell in a SF. Using $V_{DAI,T}^{DL-T}$, UE 114 can determine whether UE 114 failed to detect one or more DL DCI formats scheduling PDSCH transmissions in cells with larger indexes than an index of a cell where UE 114 detects a DL DCI format that includes $V_{DAI,T}^{DL-T}$ and schedules a PDSCH transmission in the cell in a SF of a bundling window and also determine whether UE 114 failed to detect one or more DL DCI formats scheduling PDSCH transmissions in cells in previous SFs of the bundling window.

FIG. 25 illustrates a determination and arrangement of HARQ-ACK information in a PUSCH using a counter DAI value and a total DAI value in a DL DCI format scheduling a PDSCH transmission and a DAI value in an UL DCI format scheduling a PUSCH transmission for a TDD system according to this disclosure.

UE 114 is configured by eNB 102 for PDSCH transmissions in ten cells of a TDD system where a bundling window size includes four SFs. In a first SF, SF#0 2510, eNB 102 transmits to UE 114 three DL DCI formats scheduling respective PDSCH transmissions in Cell#2, Cell#5, and Cell#7. A cell-domain counter DAI in a respective DL DCI format has a value $V_{DAI}^{DL-C}=1$ for Cell#2, a value $V_{DAI}^{DL-C}=2$ for Cell#5, and a value $V_{DAI}^{DL-C}=3$ for Cell#7 and a total DAI in each of the three DL DCI formats has a value $V_{DAI,T}^{DL-T}=3$. In a second SF, SF#1 2520, eNB 102 transmits to UE 114 three DL DCI formats scheduling respective PDSCH transmissions in Cell#3, Cell#6, and Cell#7. A cell-domain counter DAI in a respective DL DCI format has a value $V_{DAI}^{DL-C}=1$ for Cell#3, a value $V_{DAI}^{DL-C}=2$ for Cell#6, and a value $V_{DAI}^{DL-C}=3$ for Cell#7 and a total DAI in each of the three DL DCI formats has a value $V_{DAI,T}^{DL-T}=6$. In a third SF, SF#2 2530, eNB 102 transmits to UE 114 two DL DCI formats scheduling respective PDSCH transmissions in Cell#5, and Cell#7. A cell-domain counter DAI in a respective DL DCI format has a value $V_{DAI}^{DL-C}=1$ for Cell#5 and a value $V_{DAI}^{DL-C}=2$ for Cell#7 and a total DAI in each of the two DL DCI formats has a value $V_{DAI,T}^{DL-T}=8$. In a fourth SF, SF#3 2540, eNB 102 transmits to UE 114 two DL DCI formats scheduling respective PDSCH transmissions in Cell#3 and Cell#7. A cell-domain counter DAI in a respective DL DCI format has a value $V_{DAI}^{DL-C}=1$ for Cell#3 and a value $V_{DAI}^{DL-C}=2$ for Cell#7 and a total DAI in each of the three DL DCI formats has a value $V_{DAI,T}^{DL-T}=10$.

In SF#0 2510, UE 114 detects the first and third DL DCI formats and fails to detect the second DL DCI format. From the values $C_{DAI}^{DL-C}=1$ and $V_{DAI}^{DL-C}=3$ of the cell-domain counter DAI in the two detected DL DCI formats in SF#0, UE 114 determines that UE 114 failed to detect a DL DCI format for a cell with index larger than 2 and smaller than 7. From the value $V_{DAI,T}^{DL-T}=3$ of the total DAI in SF#0, UE 114 determines that UE 114 did not fail to detect any other DL DCI format. Therefore, UE 114 can determine and arrange HARQ-ACK information bits in response to receptions or absence of receptions of PDSCH transmissions scheduled by DL DCI formats transmitted in SF#0.

In SF#1 2520, UE 114 detects the first and second DL DCI formats and fails to detect the third DL DCI format. From the values $V_{DAI}^{DL-C}=1$ and $V_{DAI}^{DL-C}=2$ of the cell-domain counter DAI in the two detected DL DCI formats in SF#1, UE 114 determines that UE 114 did not fail to detect any DL DCI format for a cell with index smaller than 6. From the value $V_{DAI,T}^{DL-T}=6$ of the total DAI in SF#1, UE 114 determines that UE 114 failed to detect a DL DCI format and, using the value of the cell-domain counter DAI field in the DL DCI format for Cell#6, UE 114 determines that the DL DCI format that UE 114 failed to detect is for a cell with index larger 6. Therefore, UE 114 can determine and arrange HARQ-ACK information bits in response to receptions or absence of receptions of PDSCH transmissions scheduled by DL DCI formats transmitted in SF#1.

In SF#2 2530, UE 114 detects both the first and second DL DCI formats. From the values $V_{DAI}^{DL-C}=1$ and $V_{DAI}^{DL-C}=2$ of the cell-domain counter DAI in the two detected DL DCI formats in SF#2, UE 114 determines that UE 114 did not fail to detect any DL DCI format for a cell with index smaller than 7. From the value $V_{DAI,T}^{DL-T}=8$ of the total DAI in SF#2, UE 114 determines that UE 114 did not fail to detect a DL DCI format for a cell with index larger than 7. Therefore, UE 114 can determine and arrange HARQ-ACK information bits in response to receptions or absence of receptions of PDSCH transmissions scheduled by DL DCI formats transmitted in SF#2.

In SF#3 2540, UE 114 fails to detect both the first and second DL DCI formats. From the value $V_{DAI}^{UL-CT}=10$ of the cell/time-domain total DAI in the UL DCI format scheduling a PUSCH transmission and from the determinations in previous SFs of the bundling window, UE 114 can determine that UE 114 failed to detect two DL DCI formats in SF#3. Therefore, UE 114 can determine and arrange HARQ-ACK information bits in response to receptions or absence of receptions of PDSCH transmissions scheduled by DL DCI formats transmitted in SF#4.

For brevity, in the following, a cell/time-domain relative counter DAI is referred to as counter DAI and a time-domain total counter DAI is referred to as total DAI.

A second alternative for determining an arrangement of HARQ-ACK information bits in a codeword is for UE 114 to use a value of a DAI field in an UL DCI format scheduling a PUSCH transmission and a value $V_{DAI}^{DL-CT}$ of a counter DAI field in DL DCI format scheduling PDSCH transmissions in configured cells and SFs of a bundling window. A counter DAI field in a DL DCI format scheduling a PDSCH transmission in a cell can provide a relative counter for DL DCI formats scheduling PDSCH transmissions in all cells and in all previous SFs and for cell indexes up to the index of the cell in a current SF of a bundling window. Using $V_{DAI}^{UL-CT}$, UE 114 can determine whether UE 114 failed to detect some DL DCI formats scheduling PDSCH transmissions, particularly in SFs of a bundling window after a last SF of the bundling window where UE 114 detects a DL DCI format scheduling a PDSCH transmission.

FIG. 26 illustrates a determination and arrangement for a HARQ-ACK information payload transmission in a PUSCH using a counter DAI value in a DL DCI format scheduling a PDSCH transmission and a DAI value in an UL DCI format scheduling a PUSCH transmission for a TDD system according to this disclosure.

UE 114 is configured by eNB 102 for PDSCH transmissions in ten cells of a TDD system where a bundling window size includes four SFs. In a first SF, SF#0 2610, eNB 102 transmits to UE 114 three DL DCI formats scheduling respective PDSCH transmissions in Cell#2, Cell#5, and Cell#7. A counter DAI in a respective DL DCI format has a value $V_{DAI}^{DL-CT}=1$ for Cell#2, a value $V_{DAI}^{DL-CT}=2$ for Cell#5, and a value $V_{DAI}^{DL-CT}=3$ for Cell#7. In a second SF, SF#1 2620, eNB 102 transmits to UE 114 three DL DCI formats scheduling respective PDSCH transmissions in Cell#3, Cell#6, and Cell#7. A counter DAI in a respective DL DCI format has a value $V_{DAI}^{DL-CT}=4$ for Cell#3, a value $V_{DAI}^{DL-CT}=5$ for Cell#6, and a value $V_{DAI}^{DL-CT}=6$ for Cell #7. In a third SF, SF#2 2630, eNB 102 transmits to UE 114 two DL DCI formats scheduling respective PDSCH transmissions in Cell#5, and Cell#7. A counter DAI in a respective DL DCI format has a value $V_{DAI}^{DL-CT}=7$ for Cell#5 and a value $V_{DAI}^{DL-CT}=8$ for Cell#7. In a fourth SF, SF#3 2640, eNB 102 transmits to UE 114 two DL DCI formats scheduling respective PDSCH transmissions in Cell#3 and Cell#7.

A counter DAI in a respective DL DCI format has a value $V_{DAI}^{DL-CT}=9$ for Cell#3 and a value $V_{DAI}^{DL-CT}=10$ for Cell#7.

In SF#0 2610, UE 114 detects the first and third DL DCI formats and fails to detect the second DL DCI format. From the values $V_{DAI}^{DL-CT}=1$ and $V_{DAI}^{DL-CT}=3$ of the counter DAI in the two detected DL DCI formats in SF#0, UE 114 determines that UE 114 failed to detect a DL DCI format for a cell with index larger than 2 and smaller than 7. Therefore, UE 114 can determine and arrange HARQ-ACK information bits as {x, NACK/DTX, x}, where 'x' represents either an ACK or a NACK/DTX, in response to receptions or absence of receptions of PDSCH transmissions scheduled by DL DCI formats transmitted in SF#0.

In SF#1 2620, UE 114 detects the first and second DL DCI formats and fails to detect the third DL DCI format. From the values $V_{DAI}^{DL-CT}=4$ and $V_{DAI}^{DL-CT}=5$ of the counter DAI in the two detected DL DCI formats in SF#1, UE 114 determines that UE 114 did not fail to detect any other DL DCI format in SF#0. For SF#0 and SF#1, UE 114 can determine and arrange HARQ-ACK information bits as {x, NACK/DTX, x, x, x}.

In SF#2 2630, UE 114 detects both the first and second DL DCI formats. From the value $V_{DAI}^{DL-CT}=7$ of the counter DAI in the detected DL DCI format for Cell#5 in SF#2, UE 114 determines that UE 114 failed to detect a DL DCI format in SF#1 for a cell with larger index than Cell#6 or in SF#2 with a cell with smaller index than Cell#5. From the value $V_{DAI}^{DL-CT}=8$ of the counter DAI in the detected DL DCI format for Cell#7 in SF#2, UE 114 determines that UE 114 did not fail to detect a DL DCI format in SF#2 for a cell with smaller index than Cell#7. For SF#0, SF#1, and SF#2, UE 114 can determine and arrange HARQ-ACK information bits as {x, NACK/DTX, x, x, x, NACK/DTX, x, x}.

In SF#3 2640, UE 114 fails to detect both the first and second DL DCI formats. From the value $V_{DAI}^{UL-CT}=10$ of the UL DAI in the UL DCI format scheduling a PUSCH transmission and from the determinations in previous SFs of the bundling window, UE 114 can determine that UE 114 failed to detect two DL DCI formats for cells with larger index than Cell#7 in SF#2 or for any cells in SF#3. For SF#0, SF#1, SF#2, and SF#3, UE 114 can determine and arrange HARQ-ACK information bits as {x, NACK/DTX, x, x, x, NACK/DTX, x, x, NACK/DTX, NACK/DTX}. Therefore, UE 114 can determine and arrange the HARQ-ACK information bits in response to receptions or absence of receptions of PDSCH transmissions scheduled by DL DCI formats transmitted in all SFs of a bundling window.

It can be observed that a functionality of a DAI value, $V_{DAI}^{UL-CT}$, in an UL DCI format is same as a functionality of a total DAI value, $V_{DAI,T}^{DL-T}$, in a DL DCI format. When eNB 102 transmits DL DCI formats to UE 114 in a number of SFs within a bundling window, unless UE 114 fails to detect all DL DCI formats in a last SF from the number of SFs (error case), $V_{DAI,T}^{DL-T}$ is same as $V_{DAI}^{UL-CT}$ and, as previously described, a use of a DAI in an UL DCI format can be omitted. A use of a DAI value in an UL DCI format can also be omitted when UE 114 transmits HARQ-ACK codeword in a PUCCH in a same SF where UE 114 transmits a PUSCH scheduled by an UL DCI format that includes an UL DAI value. When an UL DAI field already exists in UL DCI formats, as in case of a TDD system (see also REF 2 and REF 3), an interpretation of the UL DAI field can be different depending on whether UE 114 is configured with up to 5 DL cells or with more than 5 DL cells. In the former case, a functionality of the UL DAI field can be as described in REF 2 and REF 3. In the latter case, a functionality of the UL DAI field can be same as for a total DAI field in a DL DCI format and UE 114 can apply a same mechanism for determining a HARQ-ACK codeword for transmission in a PUCCH and for transmission in a PUSCH. For a SPS PUSCH transmission or for a non-adaptive (not scheduled by an UL DCI format) retransmission of a data TB in a PUSCH, UE 114 determines a same HARQ-ACK codeword for transmission in a PUSCH or in a PUCCH using values $V_{DAI}^{DL-CT}$ of counter DAI fields and values $V_{DAI,T}^{DL-T}$ of total DAI fields in DL DCI formats. A same determination for a HARQ-ACK codeword can also apply when a PUSCH transmission is scheduled by an UL DCI format or, to protect against the error case, the UL DAI field value $V_{DAI}^{UL-CT}$ replaces the total counter DAI value $V_{DAI,T}^{DL-T}$ in determining the HARQ-ACK codeword while using a same mechanism for the determination as for transmission in a PUCCH.

Allocation of Resources for HARQ-ACK Transmission in a PUSCH

In Equation 2, a number of REs, $M_{RE}^{req}$, required for multiplexing HARQ-ACK information in a PUSCH depends on a MCS for an initial data TB transmission, through the term $$M_{sc}^{PUSCH\text{-}initial} \cdot N_{symb}^{PUSCH\text{-}initial} \Big/ \sum_{r=0}^{C-1} K_r,$$

on a HARQ-ACK information payload $O_{HARQ\text{-}ACK}$ and on an offset $\beta_{offset}^{PUSCH}$ that intents to decouple a data information BLER from a HARQ-ACK information BLER. For a given HARQ-ACK payload, a HARQ-ACK BLER depends on a coding method used to encode the HARQ-ACK information bits. For example, for a RM code, a coding gain can be such $M_{RE}^{req}$ increases linearly with O and therefore using a single $\beta_{offset}^{PUSCH}$ value can be sufficient. However, for a TBCC, a coding gain can be non-linear with O and UE 114 can be configured several $\beta_{offset}^{PUSCH}$ values for respective values of O thereby making $\beta_{offset}^{PUSCH}$ a function of O. For example, for HARQ-ACK payloads up to 128 bits and use of TBCC for HARQ-ACK payloads above 22 bits, eNB 102 can configure three $\beta_{offset}^{PUSCH}$ values to UE 114; a first value, $\beta_{offset}^{PUSCH}(O_1)$, for use with HARQ-ACK payloads between 23 bits and 60 bits, a second value, $\beta_{offset}^{PUSCH}(O_2)$, for use with HARQ-ACK payloads between 61 bits and 96 bits, and a third value, $\beta_{offset}^{PUSCH}(O_3)$, for use with HARQ-ACK payloads between 97 bits and 128 bits.

A coarser or a finer granularity for a range of HARQ-ACK payloads can be achieved by configuring, respectively, a smaller number or a larger number of $\beta_{offset}^{PUSCH}$ values. When eNB 102 configures a single $\beta_{offset}^{PUSCH}$ value to UE 114 for HARQ-ACK payloads encoded by a TBCC that range from $O_1$ bits to $O_2$ bits, where for example $O_1=23$ and $O_2=128$, there can be at least two approaches for eNB 102 to select the $\beta_{offset}^{PUSCH}$ value. In a first approach, eNB 102 can select the $\beta_{offset}^{PUSCH}$ value as the one providing a value of M that can achieve a desired BLER for a HARQ-ACK information payload near the mid-point of $O_1$ and $O_2$. In a second approach, in order to ensure a desired BLER at the expense of occasional unnecessary use of resources for HARQ-ACK transmission in a PUSCH, eNB 102 can select $O_1$ as a reference payload for determining a $\beta_{offset}^{PUSCH}$ value since coding gains increase as an HARQ-ACK payload increases. Even when eNB 102 configures UE 114 with a single $\beta_{offset}^{PUSCH}$ value when UE 114 uses a TBCC to encode HARQ-ACK information, eNB 102 separately configures UE 114 a first $\beta_{offset}^{PUSCH}$ value for use in case of RM coding or repetition coding (for payloads up to 22 bits) and a second $\beta_{offset}^{PUSCH}$ value for use in case of TBCC (for payloads above 22 bits).

Although the present disclosure has been described with example embodiments, various changes and modifications may be suggested to one skilled in the art. It is intended that the present disclosure encompass such changes and modifications that fall within the scope of the appended claims.

What is claimed is:

1. A method comprising:
   receiving control signaling that conveys downlink control information (DCI) formats, wherein:
   each of the DCI formats indicates scheduling for either a reception for a physical downlink shared channel (PDSCH) or a release for a semi-persistently scheduled (SPS) PDSCH in a transmission time interval (TTI) from a number of TTIs and on a cell from a number of cells,
   each TTI has a TTI index and each cell has a cell index,
   each of the DCI formats is associated with a cell index and with a TTI index for a respective PDSCH reception or SPS PDSCH release,
   each of the DCI formats, when received in a user equipment (UE) specific search space, includes a counter downlink assignment indicator (DAI) field having a value that counts DCI formats, first across cells from the number of cells according to an ascending cell index and then across TTIs from the number of TTIs according to an ascending TTI index, until the index of the TTI and the index of the cell associated with the DCI format, and
   each of the DCI formats, when received in the UE-specific search space, further includes a total DAI field having a value that counts DCI formats across all cells and across TTIs from the number of TTIs according to an ascending TTI index until the index of the TTI associated with the DCI format;
   generating acknowledgement information bits in response to receiving the one or more PDSCHs or the one or more SPS PDSCH releases; and
   transmitting the acknowledgement information bits.

2. The method of claim 1 wherein:
   each of the DCI formats, when received in a non-UE specific search space, includes the counter DAI field and does not include the total DAI field when operating in a time division duplex mode, and
   each of the DCI formats, when received in a non-UE specific search space, does not include any of the counter DAI field or the total DAI field when operating in a frequency division duplex mode.

3. The method of claim 1, wherein a TTI index for a DCI format reception is different than the TTI index for the PDSCH reception that is scheduled by the DCI format.

4. The method of claim 1, wherein the acknowledgement information bits include information for failure of a DCI format reception, information for a reception of a DCI format scheduling SPS PDSCH release, information for a correct reception of data information in a PDSCH, or information for incorrect reception of data information in a PDSCH.

5. The method of claim 1, further comprising:
   transmitting the acknowledgement information bits using Reed-Muller coding in a physical uplink control channel (PUCCH) having a first format when a number of the acknowledgement information bits is not more than 22; and
   transmitting the acknowledgement information bits using tail biting convolutional coding in a PUCCH having a second format when the number of the acknowledgement information bits is more than 22.

6. The method of claim 1, further comprising receiving additional control signaling that conveys a DCI format that indicates scheduling for a transmission of a physical uplink shared channel (PUSCH) and includes a value for a DAI field that replaces the value of the total DAI field.

7. The method of claim 1, further comprising:
   receiving a SPS PDSCH;
   generating an acknowledgement information bit in response to receiving the SPS PDSCH; and
   transmitting the acknowledgement information bit in a last location of the acknowledgement information bits.

8. A user equipment (UE) comprising:
   a receiver configured to receive control signaling that conveys downlink control information (DCI) formats, wherein:
   each of the DCI formats indicates scheduling for either a reception for a physical downlink shared channel (PDSCH) or a release for a semi-persistently scheduled (SPS) PDSCH in a transmission time interval (TTI) from a number of TTIs and on a cell from a number of cells,
   each TTI has a TTI index and each cell has a cell index,
   each of the DCI formats is associated with a cell index and with a TTI index for a respective PDSCH reception or SPS PDSCH release,
   each of the DCI formats, when received in a user equipment (UE) specific search space, includes a counter downlink assignment indicator (DAI) field having a value that counts DCI formats, first across cells from the number of cells according to an ascending cell index and then across TTIs from the number of TTIs according to an ascending TTI index, until the index of the TTI and the index of the cell associated with the DCI format, and
   each of the DCI formats, when received in the UE-specific search space, further includes a total DAI field having a value that counts DCI formats across all cells and across TTIs from the number of TTIs according to an ascending TTI index until the index of the TTI associated with the DCI format;
   a controller configured to generate acknowledgement information bits in response to the reception of the one or more PDSCHs or the one or more SPS PDSCH releases; and
   a transmitter configured to transmit the acknowledgement information bits.

9. The UE of claim 8 wherein:
   each of the DCI formats, when received in a non-UE specific search space, includes the counter DAI field and does not include the total DAI field when operating in a time division duplex mode, and
   each of the DCI formats, when received in a non-UE specific search space, does not include any of the counter DAI field or the total DAI field when operating in a frequency division duplex mode.

10. The UE of claim 8, wherein a TTI index for a DCI format reception is different than the TTI index for the PDSCH reception that is scheduled by the DCI format.

11. The UE of claim 8, wherein the acknowledgement information bits include information for failure of a DCI format reception, information for a reception of a DCI format scheduling SPS PDSCH release, information for a correct reception of data information in a PDSCH, or information for incorrect reception of data information in a PDSCH.

12. The UE of claim 8, wherein the transmitter is configured to:
transmit the acknowledgement information bits using Reed-Muller coding in a physical uplink control channel (PUCCH) having a first format when a number of the acknowledgement information bits is not more than 22, and
transmit the acknowledgement information bits using tail biting convolutional coding in a PUCCH having a second format when the number of the acknowledgement information bits is more than 22.

13. The UE of claim 8, wherein the receiver is configured to receive additional control signaling that conveys a DCI format that indicates scheduling for a transmission of a physical uplink shared channel (PUSCH) and includes a value for a DAI field that replaces the value of the total DAI field.

14. The UE of claim 8, wherein:
the receiver is configured to receive a SPS PDSCH,
the controller is configured to generate an acknowledgement information bit in response to receiving the SPS PDSCH, and
the transmitter is configured to transmit the acknowledgement information bit in a last location of the acknowledgement information bits.

15. A base station comprising:
a transmitter configured to transmit control signaling that conveys downlink control information (DCI) formats, wherein:
each of the DCI formats indicates scheduling for either a transmission for a physical downlink shared channel (PDSCH) or a release for a semi-persistently scheduled (SPS) PDSCH in a transmission time interval (TTI) from a number of TTIs and on a cell from a number of cells,
each TTI has a TTI index and each cell has a cell index,
each of the DCI formats is associated with a cell index and with a TTI index for a respective PDSCH transmission or SPS PDSCH release,
each of the DCI formats, when received in a user equipment (UE) specific search space, includes a counter downlink assignment indicator (DAI) field having a value that counts DCI formats, first across cells from the number of cells according to an ascending cell index and then across TTIs from the number of TTIs according to an ascending TTI index, until the index of the TTI and the index of the cell associated with the DCI format, and
each of the DCI formats, when received in the UE-specific search space, further includes a total DAI field having a value that counts DCI formats across all cells and across TTIs from the number of TTIs according to an ascending TTI index until the index of the TTI associated with the DCI format; and
a receiver configured to receive acknowledgement information bits in response to the transmission of the one or more PDSCHs or of the one or more SPS PDSCH releases.

16. The base station of claim 15, wherein the receiver is configured to:
receive the acknowledgement information bits using tail biting convolutional decoding, that includes a cyclic redundancy check (CRC) result, according to a first number of acknowledgement information bits, and
receive the acknowledgement information bits using tail biting convolutional decoding according to a second number of acknowledgement information bits that is smaller than the first number of acknowledgement information bits when the CRC result is false.

17. The base station of claim 15 wherein:
each of the DCI formats, when received in a non-UE specific search space, includes the counter DAI field and does not include the total DAI field when operating in a time division duplex mode, and
each of the DCI formats, when received in a non-UE specific search space, does not include any of the counter DAI field or the total DAI field when operating in a frequency division duplex mode.

18. The base station of claim 15, wherein the acknowledgement information bits include information for failure of a DCI format reception, information for a reception of a DCI format scheduling SPS PDSCH release, information for a correct reception of data information in a PDSCH, or information for incorrect reception of data information in a PDSCH.

19. The base station of claim 15, wherein the receiver is configured to:
receive the acknowledgement information bits using Reed-Muller decoding in a physical uplink control channel (PUCCH) having a first format when a number of the acknowledgement information bits is not more than 22, and
receive the acknowledgement information bits using tail biting convolutional decoding in a PUCCH having a second format when the number of the acknowledgement information bits is more than 22.

20. The base station of claim 15, wherein:
the transmitter is configured to transmit a SPS PDSCH, and
the receiver is configured to receive an acknowledgement information bit in a last location of the acknowledgement information bits.

* * * * *